United States Patent
Mu et al.

(10) Patent No.: US 12,448,410 B2
(45) Date of Patent: Oct. 21, 2025

(54) DERIVATIVE OF SARSASAPOGENIN, PHARMACEUTICAL COMPOSITION AND USE THEREOF

(71) Applicant: Phytovent Biopharma, Shenzhen (CN)

(72) Inventors: Shawn Mu, Shenzhen (CN); Na Wang, Shenzhen (CN)

(73) Assignee: Phytovent Biopharma, Shenzhen (CN)

( * ) Notice: Subject to any disclaimer, the term of this patent is extended or adjusted under 35 U.S.C. 154(b) by 1101 days.

(21) Appl. No.: 17/279,732

(22) PCT Filed: May 13, 2019

(86) PCT No.: PCT/CN2019/086530
§ 371 (c)(1),
(2) Date: Mar. 25, 2021

(87) PCT Pub. No.: WO2020/062883
PCT Pub. Date: Apr. 2, 2020

(65) Prior Publication Data
US 2022/0033436 A1   Feb. 3, 2022

(30) Foreign Application Priority Data
Sep. 29, 2018   (CN) .......................... 201811145429.4

(51) Int. Cl.
*C07J 71/00* (2006.01)
*A61K 31/58* (2006.01)
*A61K 45/06* (2006.01)
*A61P 35/00* (2006.01)

(52) U.S. Cl.
CPC ........... *C07J 71/0005* (2013.01); *A61K 31/58* (2013.01); *A61K 45/06* (2013.01); *A61P 35/00* (2018.01)

(58) Field of Classification Search
CPC ........ C07J 71/00; C07J 71/0005; A61K 31/58
See application file for complete search history.

(56) References Cited

U.S. PATENT DOCUMENTS

| 2004/0147495 A1 | 7/2004 | Barraclough et al. |
| 2020/0385418 A1 | 12/2020 | Huang et al. |

FOREIGN PATENT DOCUMENTS

| CN | 1678325 A | 10/2005 |
| CN | 104177469 A | 12/2014 |
| CN | 106905407 A | 6/2017 |
| CN | 106977581 A | 7/2017 |
| CN | 108264535 A | 7/2018 |
| CN | 109053854 A | 12/2018 |
| CN | 109206472 A | 1/2019 |

OTHER PUBLICATIONS

Foster Trends in Pharmacological Sciences 1984, 524-527.*
Hamanishi et al. Int J Clin Oncol 2016, 21, 462-473.*
Chakravarty et al. Phytochemistry 1983, 22 (12) 2843-2845.*
Search Report for PCT/CN2019/086530, dated Aug. 15, 2019.

* cited by examiner

*Primary Examiner* — Irina Neagu
(74) *Attorney, Agent, or Firm* — MaxGoLaw PLLC

(57) ABSTRACT

A derivative of sarsasapogenin is provided having a structure of formula I,

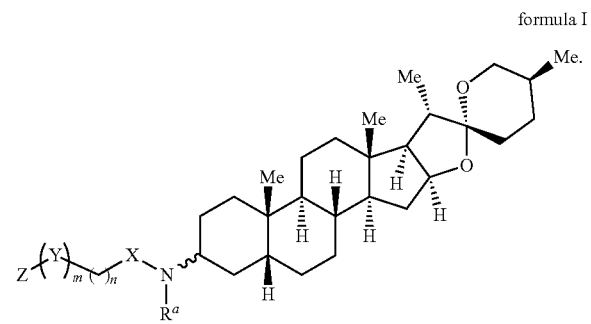

formula I A pharmaceutical composition of the aforementioned derivative of sarsasapogenin and use thereof are also provided. By systematic modification and derivatization of sarsasapogenin structure in combination with inhibitory activity assays on tumor cells, many derivative compounds are provided that have excellent inhibitory activity on tumor cells, particularly high inhibitory activity on the growth of various brain tumor cells, having potential wide application and tremendous value in treating various cancers.

21 Claims, No Drawings

DERIVATIVE OF SARSASAPOGENIN, PHARMACEUTICAL COMPOSITION AND USE THEREOF

CROSS-REFERENCE TO RELATED APPLICATION

This application is a National Stage entry of International Application No. PCT/CN2019/086530, filed on 13 May 2019, which claims priority from Chinese patent application No. 201811145429.4 filed Sep. 29, 2018, both of which are incorporated herein by reference.

TECHNICAL FIELD

The present invention relates to the technical field of pharmaceuticals, particularly to the field of chemical synthesis of pharmaceuticals, and more particularly to a derivative of sarsasapogenin, a pharmaceutical composition thereof and use thereof.

BACKGROUND

The dried tuber of Anemarrhena asphodeloides Bunge is a traditional Chinese medicine, and has efficacy against consumptive thirst and endogenous heat, pathogens, and edemas in limbs and body.

It is a commonly used Yin-nourishing herb. Its extract has demonstrated bioactivities, such as diuretic activity, anti-diabetic activity, anti-platelet aggregation activity and anti-fungal activity, and has exhibited an inhibitory effect on cyclic adenosine monophosphate phosphodiesterase.

Cancer is one of the major threats to human health at present, and causes about 15% of human deaths in the world. At present, methods for treating cancer mainly include surgical resection, radiotherapy, chemotherapy, or a combination thereof, but chemotherapy still composes the majority. The onset and development of cancer are results of a combination of environmental factors and genetic materials. The important basis for the formation and development of malignant tumors is the uncontrolled proliferation and metastatic spread of cells, so the objective of treating neoplastic diseases can be achieved by controlling the pathway and means of apoptosis, which is an important method for treating cancer at present. With the development of many disciplines, the varieties of anti-cancer drugs have significantly increased, including cytotoxins, hormones, biological response modifiers, and monoclonal antibodies, etc. It is still challenging and rather urgent to find a novel anti-cancer drug with high efficacy, high selectivity, low toxicity and no drug resistance. China has massive herbal medicine resources, and some natural products have also been used for treating tumor, such as camptothecin. Spirostane saponin has demonstrated a variety of activities, such as antibacterial activity, antiviral activity, antifungal activity and anti-inflammatory activity, as well as efficacy against platelet aggregation and diabetes and cytotoxicity.

Inducing malignant tumor cell differentiation into a normal phenotype is one of new approaches to treat tumors, and finding a low-toxic, highly effective differentiation inducer is the key of induced differentiation therapy. Some natural products, such as ginsenoside, can induce the phenotypic reversion of a variety of malignant cells, including leukemia cells, teratoma cells, liver cancer cells, etc. This indicates that such natural products have a certain application prospect in induced differentiation of cancer cells.

Therefore, derivatives of sarsasapogenin may have high practical value for the preparation of anti-cancer drugs.

SUMMARY

The present invention is intended to provide a derivative of sarsasapogenin and synthesis routes for the derivative of sarsasapogenin in order to overcome the aforementioned defects in the prior art.

In order to achieve the aforementioned purposes, one aspect of the present invention provides a derivative of sarsasapogenin having a structure of formula I below:

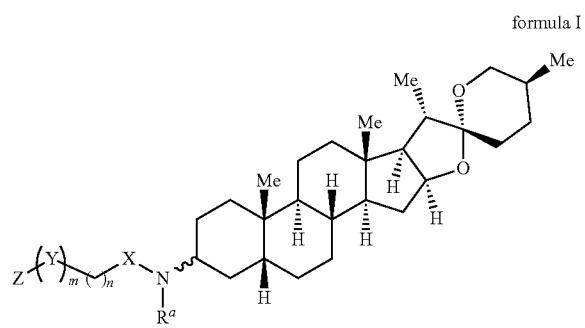

formula I wherein Z is selected from a monoheterocyclyl, a diheterocyclyl, and NR$^1$R$^2$, the monoheterocyclyl or diheterocyclyl containing one or two heteroatoms selected from sulfur, oxygen, NH and NR$^a$; R$^1$ and R$^2$ are each independently selected from hydrogen and substituted or unsubstituted C$_1$-C$_{10}$ alkyl; or R$^1$ and R$^2$ may together form a 3-8 membered ring substituted with one or more substituents selected from C$_1$-C$_{10}$ alkyl, C$_3$-C$_{10}$ cycloalkyl, C$_6$-C$_{20}$ aryl, C$_3$-C$_{14}$ heteroaryl, halogen, hydroxyl, amino, nitro, cyano, formyl, carboxyl, alkoxy, —CF$_3$, —SF$_5$ and 3-8 membered heterocyclyl containing one or more heteroatoms selected from sulfur, oxygen, NH and NR$^a$;

X is selected from C(R$^b$)(R$^c$), C(O), and S(O)$_2$, R$^b$ and R$^c$ together form a 3-8 membered carbocyclyl or a 3-8 membered heterocyclyl containing one or more heteroatoms selected from sulfur, oxygen, N, NH and NR$^a$, the 3-8 membered carbocyclyl or the 3-8 membered heterocyclyl being optionally substituted with one or more substituents selected from C$_1$-C$_{10}$ alkyl, C$_3$-C$_{10}$ cycloalkyl, C$_6$-C$_{20}$ aryl, C$_3$-C$_{14}$ heteroaryl, halogen, hydroxyl, amino, nitro, cyano, formyl, carboxyl, alkoxy, —CF$_3$, —SF$_5$ and 3-8 membered heterocyclyl containing one or two heteroatoms selected from O, S and NR$^a$.

Y is selected from C(R$^d$)(R$^e$), C(O), and S(O)$_2$, and R$^d$ and R$^e$ may together form a 3-8 membered ring or a 3-8 membered heterocyclyl containing one or more heteroatoms selected from sulfur, oxygen, NH and NR$^a$;

R$^a$, R$^b$, R$^c$, R$^d$ and R$^e$ are independently selected from C$_1$-C$_{10}$ alkyl, C$_3$-C$_{10}$ cycloalkyl, C$_6$-C$_{20}$ aryl and C$_3$-C$_{14}$ heteroaryl optionally substituted with at least one substituent selected from halogen, hydroxyl, amino, nitro, cyano, formyl, carboxyl, alkoxy, —CF$_3$, and —SF$_5$;

R$^b$ and R$^d$ may be linked by a chemical bond;

n is an integer selected from 0 to 10; and m is selected from 0 and 1.

Preferably, the structure of the derivative is shown by formula II:

formula II

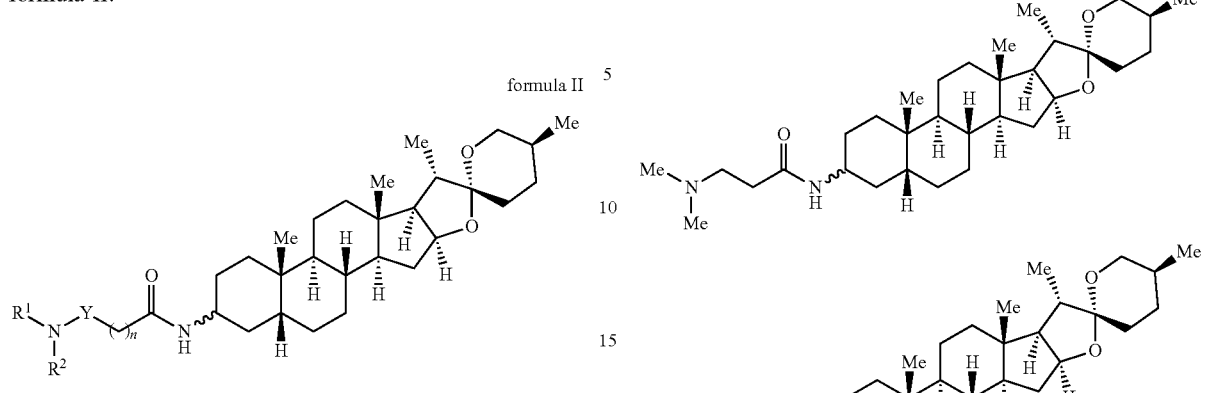

wherein, Y, $R^1$, $R^2$ and n are defined as above.

Preferably, the structure of the derivative is shown by formula III:

formula III

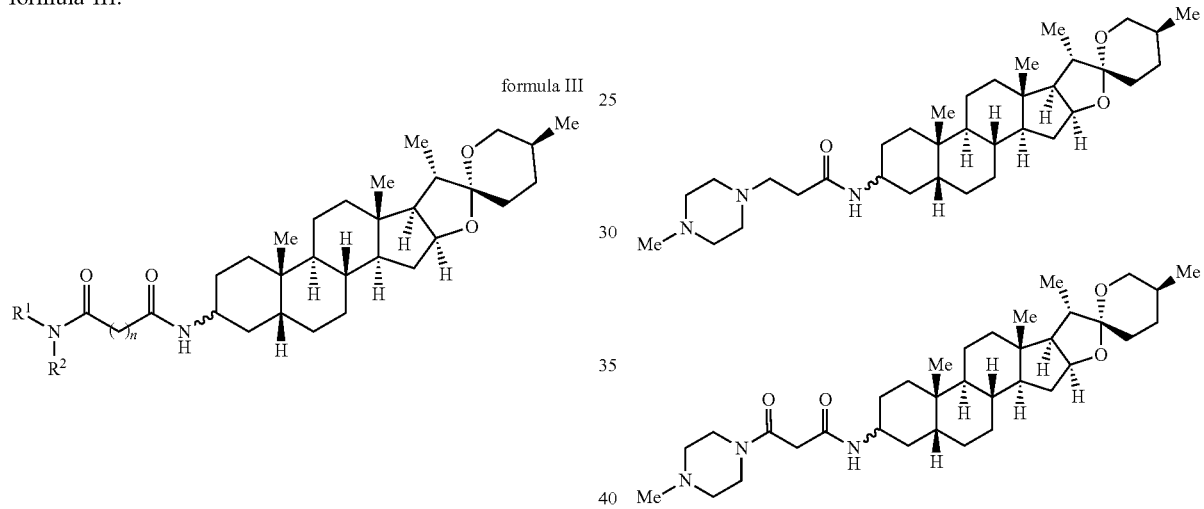

wherein, $R^1$ and $R^2$ are defined as above.

In another preferred embodiment, the structure of the derivative is shown by formula IV:

formula IV

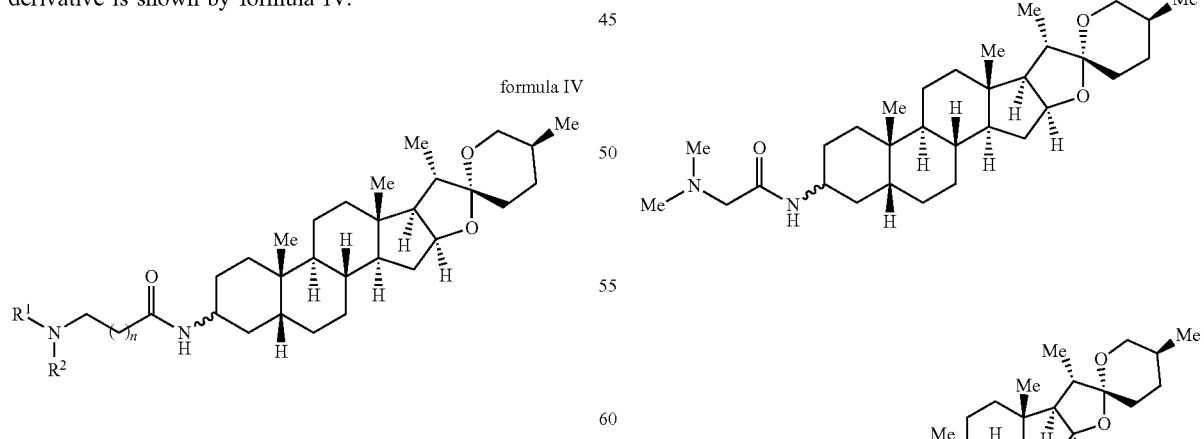

wherein, $R^1$ and $R^2$ are defined as above.

Preferably, the derivative is selected from one of the following compounds, a mixture of diastereomers of the following compounds and an enantiomer of the following compounds:

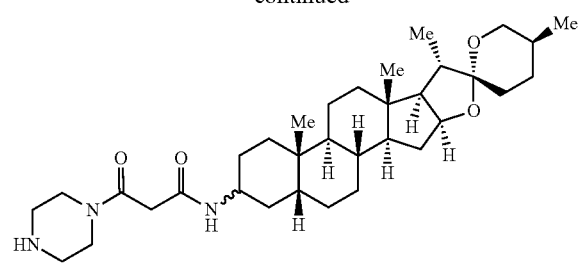
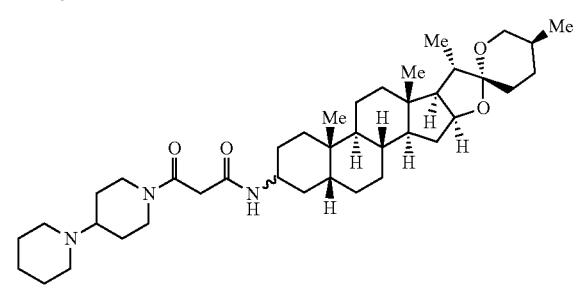
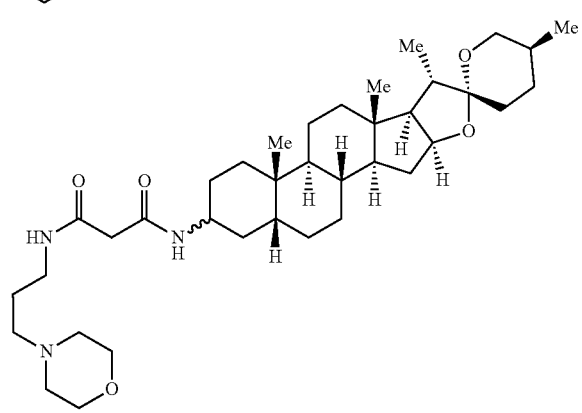
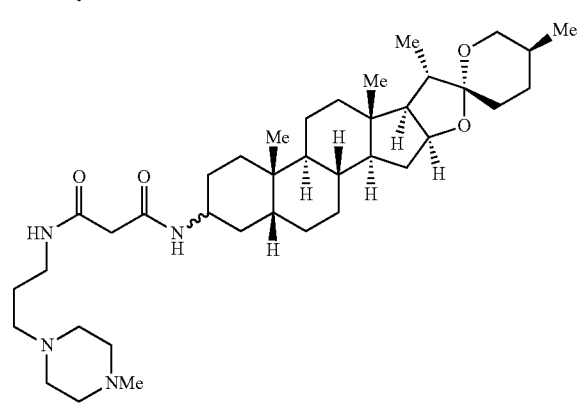
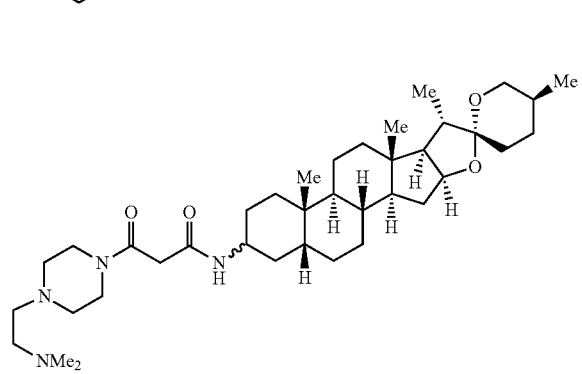
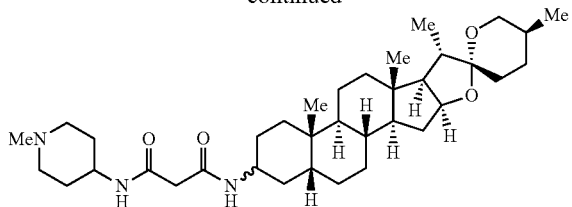
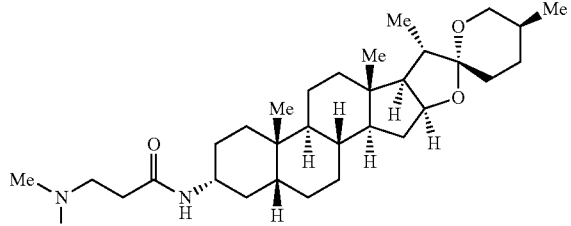
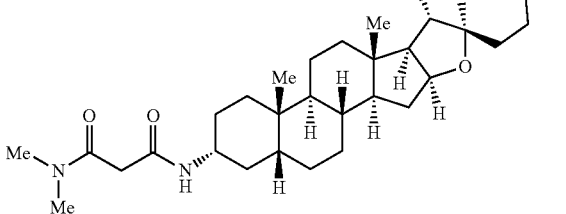
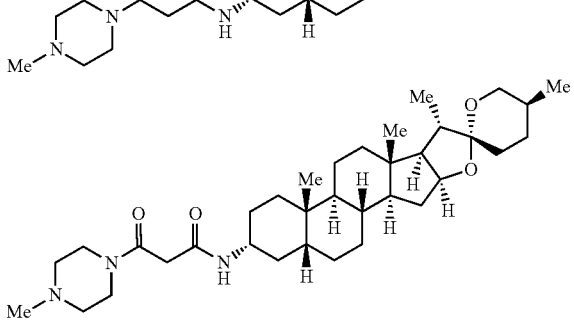
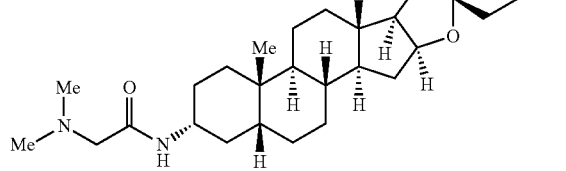
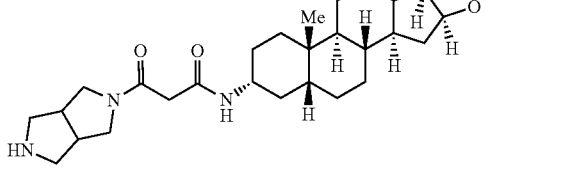

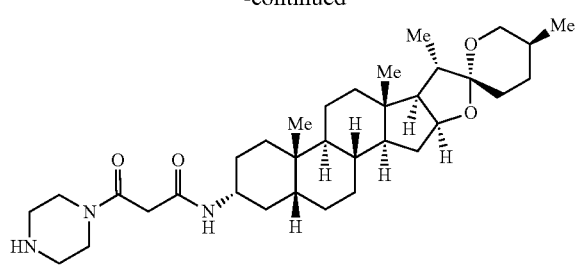
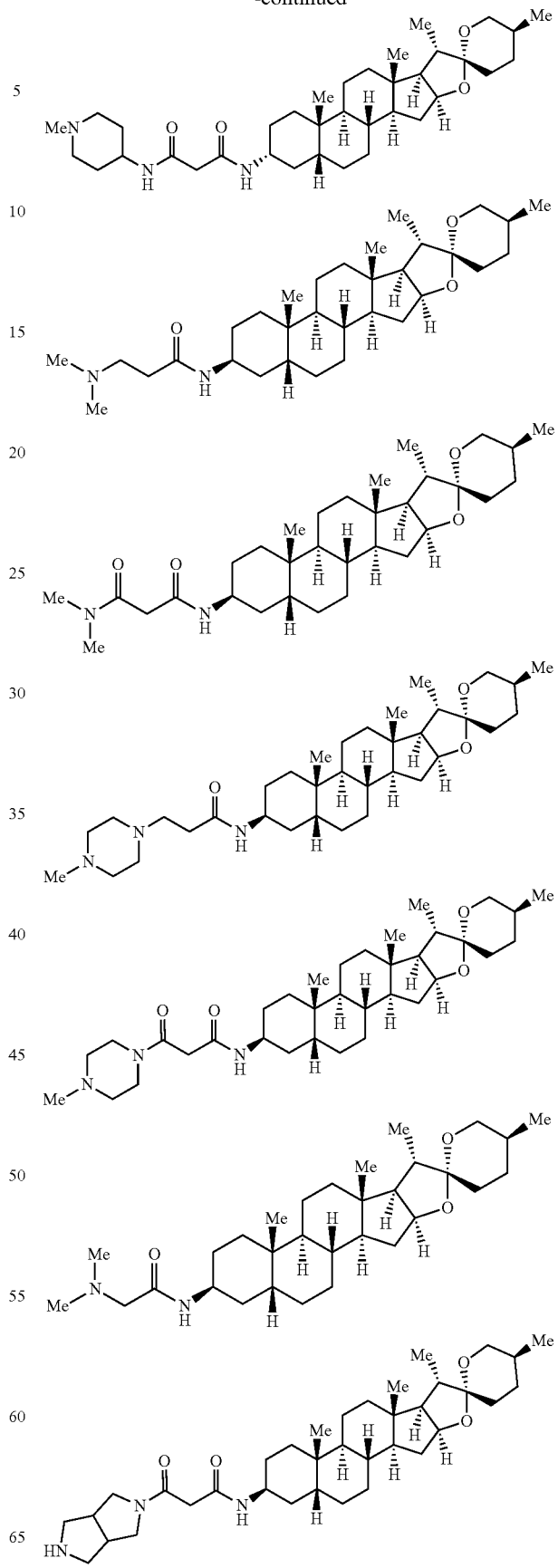

-continued

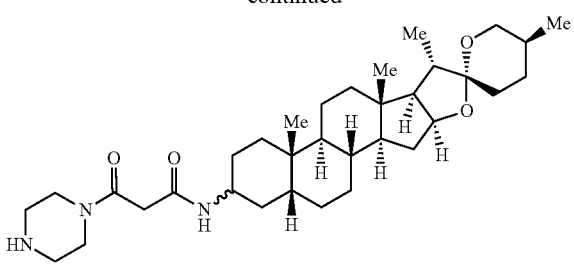

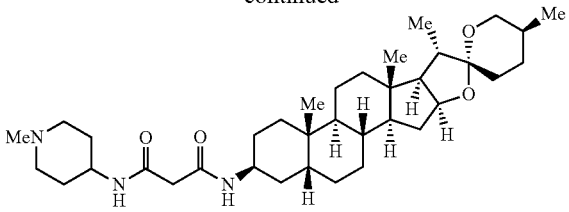

Preferably, the derivative comprises a corresponding deuterated compound on which any one or more hydrogen atoms are substituted by a stable isotope deuterium.

Another aspect of the present invention provides a pharmaceutical composition comprising the aforementioned compound of formula I, a pharmaceutically acceptable salt, stereoisomer, tautomer or prodrug thereof, or a pharmaceutically acceptable carrier thereof; and preferably, the pharmaceutical composition also comprises an anti-tumor agent including one or more of a chemotherapeutic agent, a targeted agent against tumor or an anti-tumor antibody.

Preferably, the pharmaceutically acceptable salt is selected from the group consisting of hydrochloride, hydrobromide, sulfate, phosphate, mesylate, trifluoromesylate, benzenesulfonate, p-toluenesulfonate (toluenesulfonate), 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate.

Preferably, the anti-tumor agent includes but is not limited to immunotherapeutic drug for cancer: PD-1 antibody, CTLA-4 antibody, PD-L1 antibody, PD-L2 antibody, any other chemotherapeutic drug or a targeted agent, such as a kinase inhibitor.

The present invention also provides use of the compound in treating cancers, eye diseases, psychological disorders, depression, anxiety, Alzheimer's disease, and/or autoimmune diseases.

Preferably, the cancers include but are not limited to colon cancer, breast cancer, gastric cancer, lung cancer, colorectal cancer, pancreatic cancer, ovarian cancer, prostatic cancer, kidney cancer, liver cancer, brain cancer, melanoma, multiple myeloma, chronic myelocytic leukemia, hematological neoplasm, lymphoid tumor, including metastatic lesions in other tissues or organs remote from primary tumor sites.

By systematic modification and derivatization of sarsasapogenin structure in combination with inhibitory activity assays on tumor cells, the inventor surprisingly found that many derivative compounds have excellent inhibitory activity on tumor cells, particularly high inhibitory activity on the growth of various brain tumor cells, having potential wide application and tremendous value in treating various cancers, making up for the deficiency of modified derivatives of sarsasapogenin in the prior art and having important scientific and commercial application value.

DETAILED DESCRIPTION

The present invention will be more clearly understood from the description of specific embodiments below.

The term "alkyl" used herein refers to monovalent saturated aliphatic hydrocarbon groups with 1 to 10 carbon atoms, including linear and branched hydrocarbon groups, such as methyl ($CH_3$—), ethyl ($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), secbutyl ((CH$_3$)(CH$_3$CH$_2$)CH—), tert-butyl ((CH$_3$)$_3$C—), n-pentyl (CH$_3$CH$_2$CH$_2$CH$_2$CH$_2$—) and neopentyl ((CH$_3$)$_3$CCH$_2$—).

The term "alkyl" used herein includes substituted or unsubstituted alkyl groups.

The term "substituted or unsubstituted" used herein refers to that the group may be unsaturated or H in the group is substituted by one or more (preferably 1 to 6, more preferably 1 to 3) substituents.

The term "substituted" used herein refers to that the group has one or more (preferably 1 to 6, more preferably 1 to 3) substituents selected from the group consisting of halogen, hydroxyl, —NH$_2$, nitro, —CN, C$_1$-C$_4$ alkyl, C$_1$-C$_4$ haloalkyl, C$_1$-C$_4$ alkoxy, C$_3$-C$_6$ cycloalkyl, C$_2$-C$_4$ alkenyl, C$_2$-C$_4$ alkynyl, phenyl and benzyl.

The term "cycloalkyl" used herein refers to a substituted or unsubstituted C$_3$-C$_{12}$ cycloalkyl group.

The term "alkoxy" used herein refers to a —O-alkyl group which may be saturated or unsaturated, and may be branched, linear or cyclic. Preferably, the alkoxy group has 1 to 10 carbon atoms, and more preferably 1 to 6 carbon atoms. Representative examples include (but are not limited to) methoxy, ethoxy, and propoxy.

The term "aryl" used herein refers to a monovalent aromatic carbocyclic group containing 6 to 20 (preferably 6 to 14) carbon atoms in the form of a monocyclic ring (such as phenyl) or a fused ring (such as naphthyl or anthryl), and if the binding site is on an aromatic carbon atom, the fused ring may be non-aromatic (such as 2-benzoxazolinone and 2H-1,4-benzoxazine-3(4H)-one-7-yl).

Preferred aryl groups include phenyl and naphthyl. This term includes a substituted or unsubstituted form, wherein the substituent is defined as above.

The term "alkenyl" used herein refers to an alkenyl group with 2 to 10 (such as 2 to 6 or 2 to 4) carbon atoms and at least one (such as 1 to 2) unsaturated olefinic bond (>C=C<). Such groups include, for example, vinyl, allyl, and but-3-enyl.

The term "cycloalkyl" used herein refers to a cyclic alkyl group with 3 to 10 carbon atoms in the form of a monocyclic ring or polycyclic ring (including a fused ring system, a bridged ring system, and a spiro-ring system). In the fused ring system, one or more rings may be cycloalkyl, heterocyclyl, aryl, or heteroaryl groups, as long as the binding site is on the ring of the cycloalkyl group. Suitable examples of cycloalkyl include, for example, adamantyl, cyclopropyl, cyclobutyl, cyclopentyl, and cyclooctyl.

The term "halo" or "halogen" used herein refers to fluorine, chlorine, bromine, and iodine.

The term "heteroaryl" used herein refers to an aromatic group with 1 to 10 carbon atoms and 1 to 4 heteroatoms selected from oxygen, nitrogen and sulfur in the ring. Such heteroaryl may be a monocyclic ring (such as pyridyl or furyl) or a fused ring (such as indolizinyl or benzothienyl), wherein the fused ring may be non-aromatic and/or contains a heteroatom, as long as the binding site is an atom of the aromatic heteroaryl group. In one embodiment, the cyclic atoms nitrogen and/or sulfur of heteroaryl are optionally oxidized into N-oxide (N—O), sulfinyl, or sulfonyl. Preferably, heteroaryl includes pyridyl, pyrrolyl, indolyl, thienyl, and furyl. This term includes substituted or unsubstituted heteroaryl.

The term "substituted heteroaryl" used herein refers to a heteroaryl substituted with 1 to 5, preferably 1 to 3, more preferably 1 to 2 substituents, and the substituents are selected from the same group of substituents defined by substituted aryl.

The term "heterocyclic ring", "heterocyclic", "heterocyclic alkyl" or "heterocyclyl" used herein refers to a saturated, partially saturated or unsaturated group (but not aromatic) having a monocyclic ring or a fused ring (including a bridged ring system and a spiro-ring system) of 1 to 10 carbon atoms and 1 to 4 (such as 3) heteroatoms selected from nitrogen, sulfur and oxygen, and in the fused ring system, one or more rings may be cycloalkyl, aryl, or heteroaryl, as long as the binding site is on the non-aromatic ring. In one embodiment, the nitrogen atom and/or sulfur atom of the heterocyclic group are optionally oxidized to provide a N-oxide, sulfinyl or sulfonyl moiety.

The term "substituted heterocyclo-", "substituted heterocycloalkyl" or "substituted heterocyclyl" used herein refers to a heterocyclic group substituted with 1 to 5 (such as 1 to 3) substituents the same as those defined by substituted cycloalkyl.

The term "stereoisomer" used herein refers to compounds with different spatial arrangement in one or more stereocenters. Stereoisomers include enantiomers and diastereomers.

The term "tautomer" used herein refers to an alternative form of a compound with different proton positions, such as enol-keto and imine-enamine tautomerism, or a tautomeric form of heteroaryl groups containing cyclic atoms connected to the —NH— moiety of the ring and the N-moiety of the ring, such as pyrazole, imidazole, benzimidazole, triazole, and tetrazole.

The present invention provides a pharmaceutical composition, comprising an active ingredient of a safe and effective amount range, and a pharmaceutically acceptable carrier.

The "active ingredient" used herein refers to the compound of formula I herein or a pharmaceutically acceptable salt, stereoisomer or tautomer, or prodrug thereof.

The "active ingredient" and the pharmaceutical composition herein can be used as an IDO inhibitor.

In another preferred embodiment, the active ingredient or the pharmaceutical composition is used for preparing a drug for preventing and/or treating tumors. In another preferred embodiment, the active ingredient or the pharmaceutical composition is used for preparing a drug for preventing and/or treating IDO-mediated diseases.

"Safe and effective amount" refers to that the amount of the active ingredient is sufficient to significantly improve the condition without causing serious side effects. In general, the pharmaceutical composition comprises 1 mg to 2000 mg of active ingredient/dose, and preferably 10 mg to 200 mg of active ingredient/dose. Preferably, the "dose" is a tablet.

"Pharmaceutically acceptable carrier" refers to one or more compatible solid or liquid fillers or gel substances, which are suitable for human use and must have sufficient purity and low toxicity.

"Compatible" herein refers to that the components in the composition can be mixed with the active ingredient of the present invention and can be mixed with each other, without significantly reducing the efficacy of the active ingredient.

The compound of the preferred embodiment of the present invention can be administered as a separate active agent, or can be used in combination with one or more other agents for treating cancer.

The compound of the preferred embodiment of the present invention is also effective when used in combination with known therapeutic agents and anticancer agents, and currently known combinations of the compounds and other anti-tumor agents or chemotherapeutic agents are within the scope of the preferred embodiments. For examples of such agents, see Cancer Principles and Practice of Oncology, V. T. Devita and S. Hellman (editors), 6th edition (Feb. 15, 2001), Lippincott Williams & Wilkins Press. Based on the specific properties of the drug and the cancer involved, those of ordinary skill in the art can specify effective agent combinations. Such anti-tumor agents include (but are not limited to) the following: estrogen receptor modulators, androgen receptor modulators, retinol receptor modulators, cytotoxicity/cell growth inhibitors, anti-proliferative agents, isopentenyl transferase inhibitors, histone deacetylase (HDAC) inhibitors, HMG-CoA reductase inhibitors and other angiogenesis inhibitors, cell proliferation and survival signaling inhibitors, apoptosis inducers and reagents interfering with cell cycle checkpoints, CTLA4 antibody, PD-1 antibody and PD-L1 antibody, etc. The compound of the preferred embodiment is also effective when co-administered with radiotherapy.

In general, the compound of the preferred embodiment will be administered at a therapeutically effective amount through any acceptable route of agents with similar effects. The actual amount of the compound (i.e., the active ingredient) of the preferred embodiment is determined according to many factors, such as the severity of the disease, the age and health condition of the patient, the efficacy of the compound used, the route and mode of administration, and other factors. The drug can be administered several times a day, preferably once or twice per day. All these factors are considered by an attending doctor.

For the purpose of preferred embodiment, a therapeutically effective amount may generally refer to a total daily amount administered in one dose or multiple doses to a patient, e.g., about 0.001 mg/kg body weight to about 1000 mg/kg body weight per day, and preferably about 1.0 mg/kg body weight to about 30 mg/kg body weight per day. A dosage unit composition may include its dose factor to form a daily dose. Selection of dosage form depends on various factors, such as the mode of administration and the bioavailability of active ingredient. In general, the compound of the preferred example can be administered as a pharmaceutical composition through any of the following routes: oral administration, systemic administration (such as transdermal or intranasal administration, or by suppository) or parenteral administration (such as intramuscular, intravenous or subcutaneous administration). The preferred route of administration is oral administration, and a daily dose can be determined according to the degree of bitterness for convenience. The composition may be in the form of tablets, pills, capsules, semisolids, powders, sustained-release preparations, solutions, suspensions, elixirs, aerosols or any other appropriate compositions. Another preferred route for administering the compound of the preferred embodiment is inhalation. This is an effective method for directly delivering a therapeutic agent into the respiratory tract (see, for example, U.S. Pat. No. 5,607,915).

Suitable pharmaceutically acceptable carriers or excipients include, for example, treating agents, drug delivery modifiers and enhancers, such as calcium phosphate, magnesium stearate, talc, monosaccharides, disaccharides, starch, gelatin, cellulose, sodium methylcellulose, carboxymethyl cellulose, glucose, hydroxypropyl-β-cyclodextrin, polyvinylpyrrolidone, low-melting-point waxes, ion exchange resin, etc., and combinations of any two or more of those above. Liquid and semisolid excipients may be selected from glycerol, propanediol, water, ethanol and various oils including petroleum, animal oil, vegetable oil or synthetic sources such as peanut oil, soybean oil, mineral oil, sesame oil, etc. Preferred liquid carriers, particularly carriers for injectable solutions, include water, saline, aqueous glucose solution, and ethylene glycol. Other suitable pharmaceutically acceptable excipients are described in Remington's Pharmaceutical Sciences, Mack Pub. Co., New Jersey (1991), which is incorporated herein by reference.

The term "pharmaceutically acceptable salt" used herein refers to non-toxic acid or alkaline-earth metal salts of the compound of formula I. Such salts can be prepared in situ when the compound of formula I is finally separated and purified, or can be prepared through the respective reaction between suitable organic or inorganic acid or base and basic or acidic functional groups. Representative salts include, but are not limited to, acetate, adipate, alginate, citrate, aspartate, benzoate, benzene sulfonate, bisulfate, butyrate, camphonate, camphosulfonate, digluconate, cyclopentane propionate, dodecyl sulfate, ethanesulfonate, glucoheptanoate, glycerophosphate, hemisulfate, heptanoate, caproate, fumarate, hydrochloride, hydrobromide, hydriodide, 2-hydroxyethanesulfonate, lactate, maleate, methanesulfonate, nicotinate, 2-naphthylsulfonate, oxalate, pamoate, pectate, thiocyanate, 3-phenylpropionate, picrate, pivalate, propionate, succinate, sulfate, tartrate, thiocyanate, p-toluenesulfonate, and undecanoate. In addition, nitrogenous basic groups may be quaternized by the following reagents: alkyl halides, such as methyl, ethyl, propyl and butyl chloride, bromide and iodide; dialkyl sulfates, such as dimethyl, diethyl, dibutyl and dipentyl sulfate; long-chain halides, such as decyl, lauryl, myristyl and stearyl chloride, bromide and iodide; and aralkyl halides, such as benzyl and phenethyl bromides, etc. Thereby, a water-soluble, oil-soluble or dispersible product is obtained. Examples of acids capable of forming a pharmaceutically acceptable acid addition salt include inorganic acids such as hydrochloric acid, sulfuric acid and phosphoric acid), and organic acids such as oxalic acid, maleic acid, methanesulfonic acid, succinic acid and citric acid. A base addition salt can be prepared in situ when the compound of formula I is finally separated and purified, or can be prepared through the reaction between the carboxylic acid moiety and a suitable base (such as pharmaceutically acceptable metal cation hydroxide, carbonate or bicarbonate), ammonia or organic primary amine, secondary amine or tertiary amine. Pharmaceutically acceptable salts include, but are not limited to, salts of cations based on alkali metals and alkaline-earth metals such as sodium, lithium, potassium, calcium, magnesium and aluminum, and non-toxic ammonium, quaternary ammonium and amine cations including but not limited to ammonium, tetramethylammonium, tetraethylammonium, methylamine, dimethylamine, trimethylamine, triethylamine, ethylamine, etc. Other representative organic amines for forming base addition salts include diethylamine, ethylenediamine, ethanolamine, diethanolamine, piperazine, etc.

The term "pharmaceutically acceptable prodrug" used herein refers to the prodrugs of the compounds of these preferred examples, which can be quickly converted into the parent compound of the aforementioned formula in the body, e.g., hydrolyzed in blood. Complete discussions are provided in "T. Higuchi and V. Stella, Pro-drugs as Novel Delivery Systems, volume 14 of A.C.S. 15 Symposium Series" and "Edward B. Roche, Bioreversible Carriers in Drug Design, American Pharmaceutical Association and Pergamon Press, 1987", which are both incorporated herein by reference.

The present invention provides a method for preparing the compound of formula I. Two different isomers can be respectively obtained according to the preparation methods described in solution 1 and solution 2.

Solution 1 is:
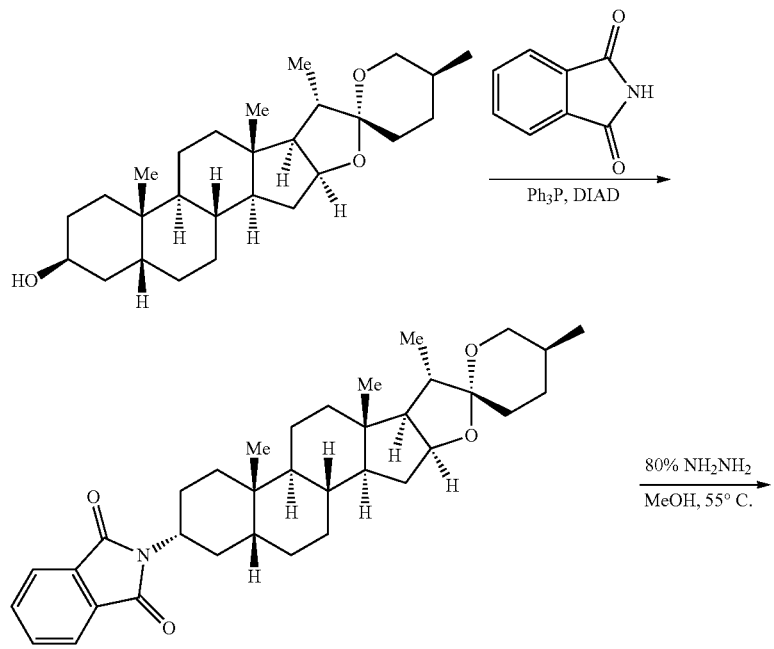
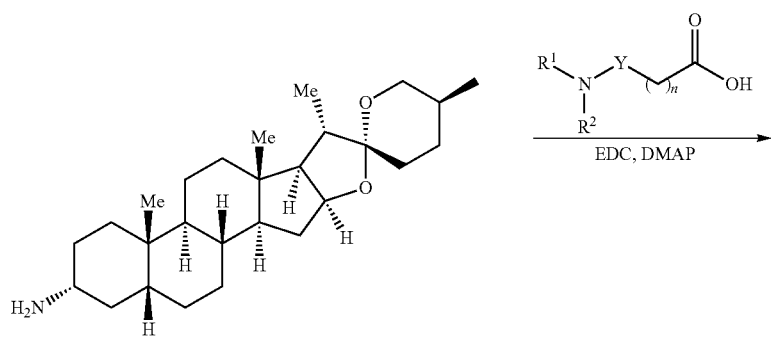
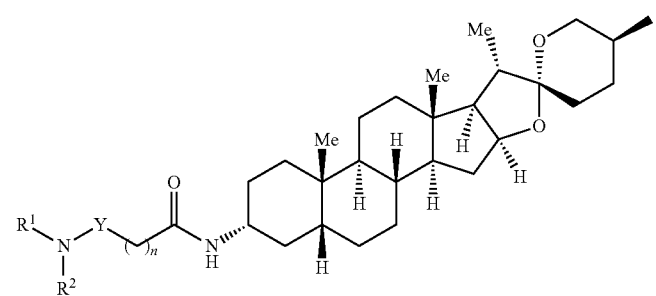

Solution 2 is:
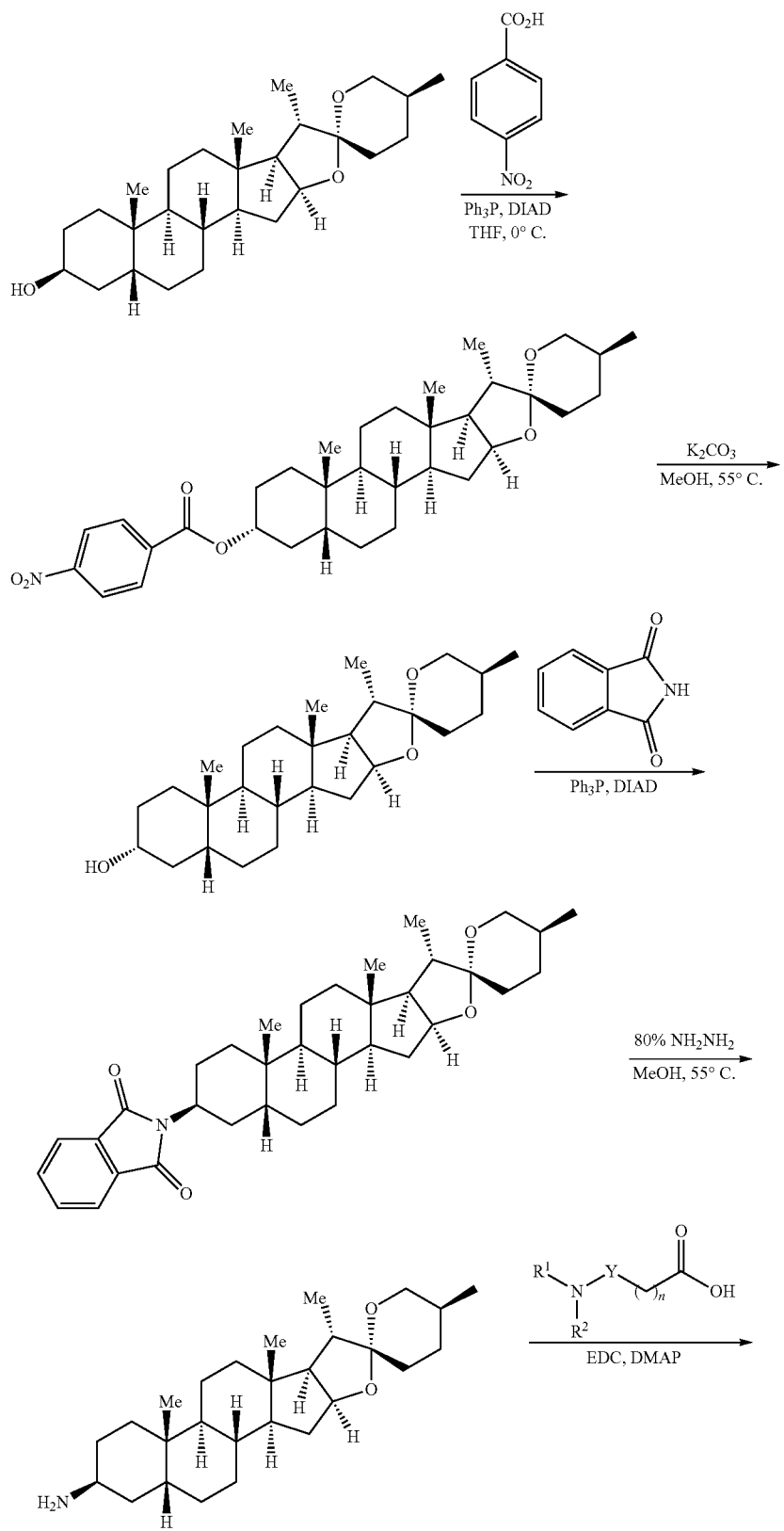

-continued

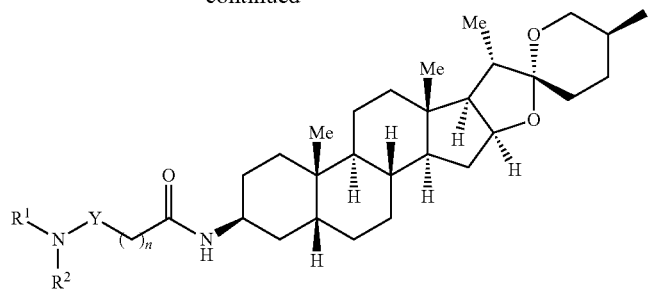

In the above formulas, $R^1$, $R^2$, Y and n are defined as above.

The present invention will be further described in conjunction with the following specific examples. It should be understood that these examples are merely intended to illustrate the present invention rather than limit the scope of the present invention.

The abbreviations have following meanings:

DBU refers to 1,8-diazabicyclo[5.4.0]undec-7-ene; DIBAL refers to diisobutylaluminium hydride; DIAD refers to diisopropyl azodicarboxylate; DIEA refers to diisopropylethylamine; DMAP refers to N,N-dimethylaminopyridine; DME refers to 1,2-dimethoxyethane; DMF refers to N,N-dimethylformamide; DMPE refers to 1,2-bis(dimethylphosphino)ethane; DMSO refers to dimethylsulfoxide; DPPB refers to 1,4-bis(diphenylphosphino)butane; DPPE refers to 1,2-bis(diphenylphosphino)ethane; DPPF refers to 1,1'-bis(diphenylphosphino)ferrocene; DPPM refers to 1,1'-bis(diphenylphosphino)methane; EDC refers to 1-(3-dimethylaminopropyl)-3-ethylcarbodiimide hydrochloride; HATU refers to 2-(7-aza-1H-benzotriazole-1-yl)-1,1,3,3-tetramethylurea hexafluorophosphate; HMPA refers to hexamethylphosphoramide; IPA refers to isopropanol; LDA refers to lithium diisopropylamide; LHMDS refers to lithium bis(trimethylsilyl) amide; LAH refers to lithium aluminum hydride; NCS refers to N-chlorosuccinimide; PyBOP refers to benzotriazole-1-yl-oxytripyrrolidinophosphonium benzotriazole hexafluorophosphate; TDA-I refers to tris(2-(2-methoxyethoxy)ethyl)amine; DCM refers to dichloromethane; TEA refers to triethylamine; TFA refers to trifluoroacetic acid; THF refers to tetrahydrofuran; NCS refers to N-chlorosuccinimide; NMM refers to N-methylmorpholine; NMP refers to N-methylpyrrolidone; $PPh_3$ refers to triphenylphosphine; RBF refers to a round-bottom flask; and r.t. refers to room temperature.

Unless otherwise defined, all the professional and scientific terms used herein have the same meanings as those familiar to those skilled in the art. In addition, any method and material similar or equivalent to the described contents can be applied in the method of the present invention. The preferred implementation methods and materials described herein are for illustrative purpose only.

Example 1 (QBHN0174)

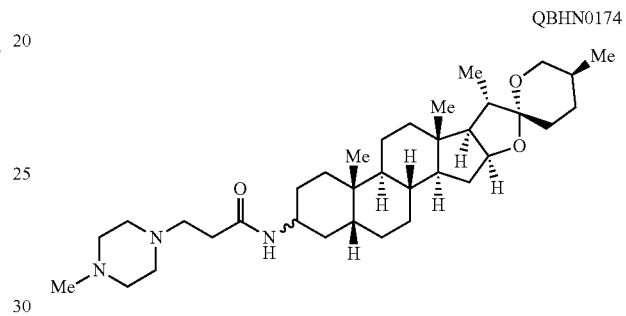

The specific preparation process of QBHN0174 is as follows:
Step 1: Intermediate 1

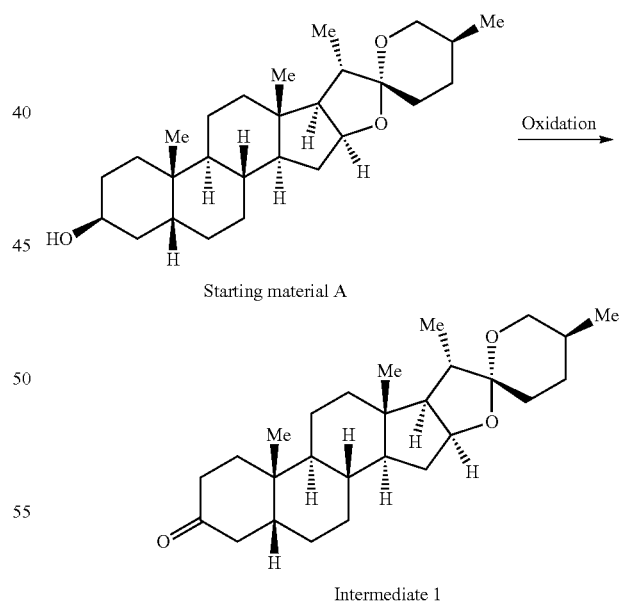

5 g of starting material A was added into a 500 mL round-bottom flask, and dissolved with 100 mL of acetone; 5 mL of Jones Reagent was added into the reaction system dropwise at 0° C. until the color of solution completely turned from amaranth into green; 15 minutes later, the solution was warmed to r.t. and stirred for another 1 hour keeping r.t. until TLC indicated the end of reaction (PMA chromogenic reaction). After the reaction was complete, solids were removed by suction filtration; the filtrate was concentrated to dryness and then redissolved with DCM. The DCM phase was washed twice with water, dried and concentrated. The residue was purified by silica gel column chromatography to give 5 g of white solid product (intermediate 1).

Step 2: Intermediate 2

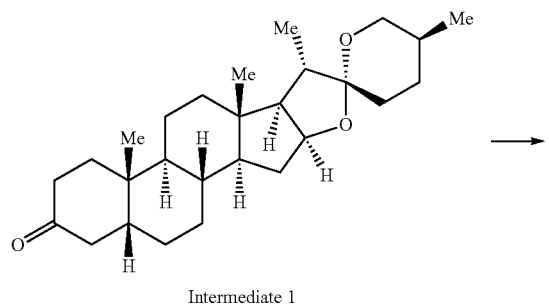

Intermediate 1

→

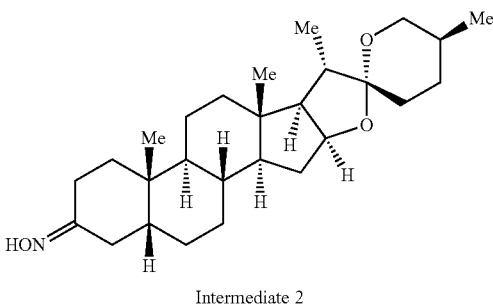

Intermediate 2

5 g of intermediate 1 and 1.7 g of NH₃OH·HCl were added into a 100 mL round-bottom flask and dissolved with 50 mL of anhydrous pyridine. The reaction system was stirred for 1 to 2 hours at 70° C. until TLC indicated the end of reaction (PMA chromogenic reaction). After the reaction was completed, the mixture was concentrated to dryness and redissolved with DCM, the DCM phase was washed twice with IN aqueous HCl, dried, and concentrated to dryness. The residue was purified by silica gel column chromatography to give 5.2 g of yellowish solid crude product.

Step 3: Intermediate 3

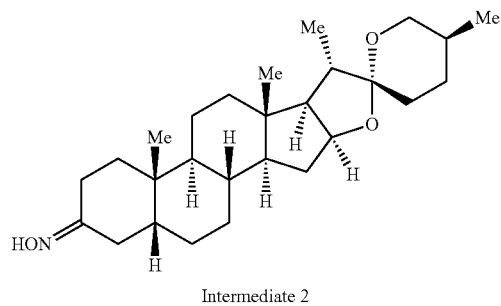

Intermediate 2

→

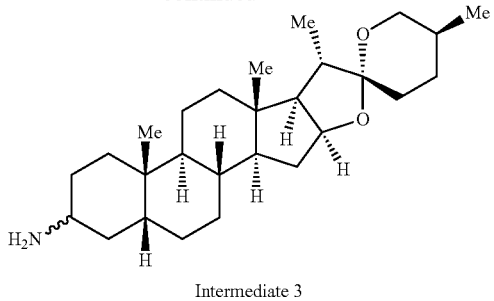

Intermediate 3

5 g of intermediate 2 was added into a 500 mL round-bottom flask and dissolved with 100 mL of anhydrous MeOH, and then 4.2 g of NiCl₂·6H₂O was added at 0° C.; 15 minutes later, 2.7 g of NaBH₄ was added in batches; and 30 minutes later, the mixture was warmed to r.t. and stirred for 4 hours until TLC indicated the end of reaction (PMA chromogenic reaction). After the reaction was completed, the solid was removed by filtration. The filtrate was concentrated to dryness and the residue was purified by silica gel chromatography to give 5 g of white solid product.

Step 4: QBHN0174

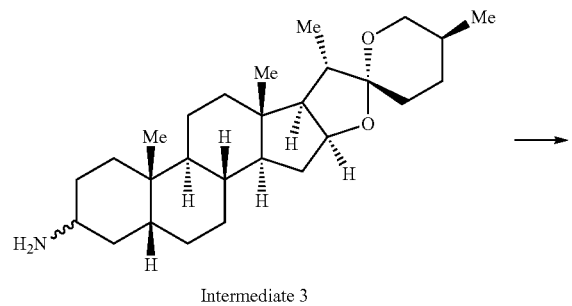

Intermediate 3

→

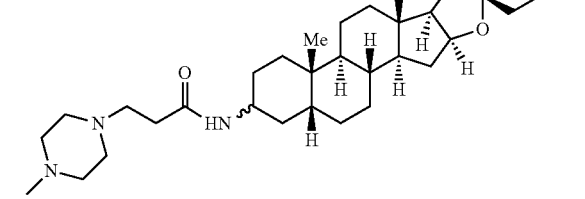

Example 1

In a round-bottom flask, 0.055 g of intermediate 3, 0.041 g of 3-(4-methylpiperazin-1-yl)-propionic acid, 0.046 g of EDC, 0.084 mL of triethylamine and 0.003 g of DMAP were successively dissolved in 2 mL of dichloromethane, and the solution was incubated at room temperature for 2 hours. After the reaction was completed, the mixture was washed twice with saturated aqueous NH₄Cl solution, dried, and was purified by silica gel column chromatography to give 25 mg of product.

¹HNMR (400 MHz, CDCl₃) δ 0.76 (s, 3H), 0.80-2.30 (m, 36H), 2.25-2.80 (m, 11H), 3.25-4.10 (m, 2H), 4.150-4.55 (m, 2H), 8.60-8.70 (m, 5H); MS: [M+1]570.5

Example 1A (QBHN0174A)

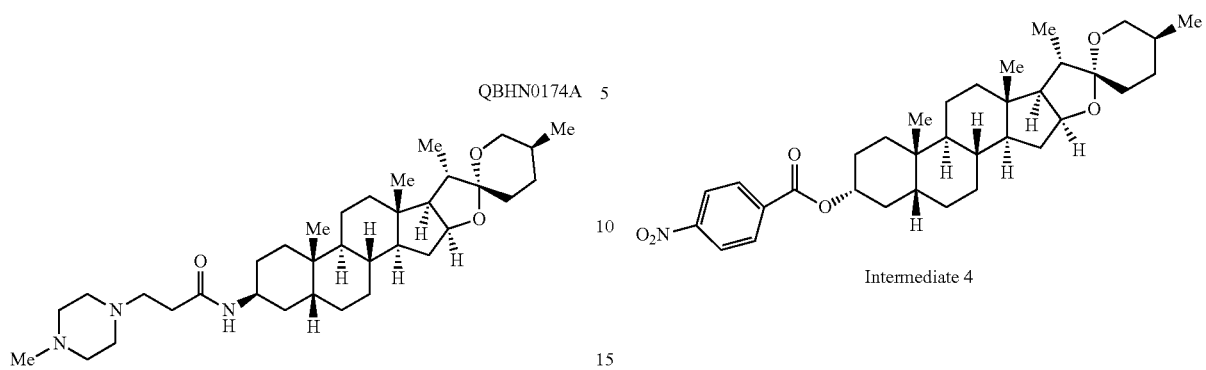

The specific preparation process of QBHN0174A is as follows:

Step 1: Intermediate 4

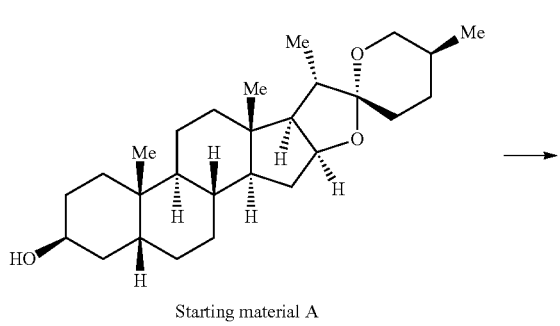

In argon atmosphere, 0.5 g of starting material A (sarsasapogenin), 0.4 g of p-nitrobenzoic acid and 0.63 g of PPh$_3$ were dissolved in 5 mL of anhydrous THF. After stirring and cooling in ice bath for 5 minutes, DIAD was added into the reaction system dropwise. The reaction system was stirred for another 10 minutes. The ice bath was removed and the solution was incubated at room temperature for 3 hours. The solution was concentrated, and the extraction was performed with sodium bicarbonate solution/dichloromethane. The extract was purified by silica gel column chromatography (PE:EA=45:1) and preparative thin layer chromatography (PE:EA=15:1). The reaction was monitored using vanillin solution. The yield was 55%.

Step 2: Intermediate 5

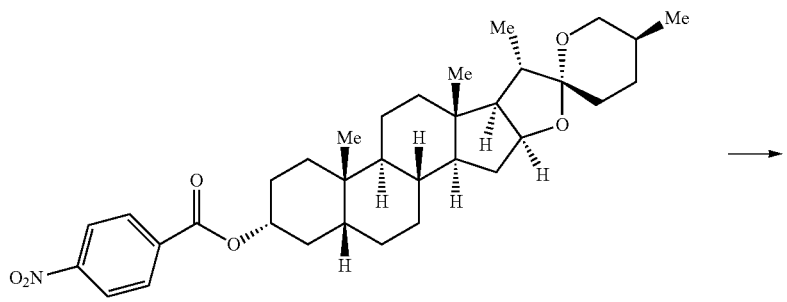

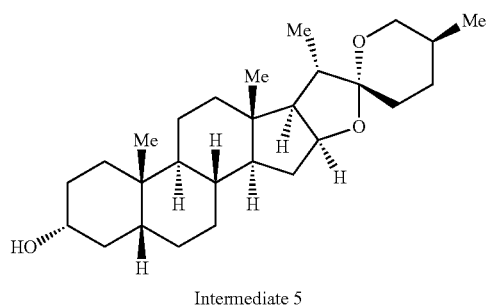

0.36 g of intermediate 4 and 0.35 g of K$_2$CO$_3$ were dissolved with 15 mL of MeOH and the reaction system was stirred at 55° C. overnight. Then solvent was removed, and extraction was performed with water/dichloromethane; the organic layer was concentrated to give a product, which was directly used in the next reaction. The reaction was monitored by using vanillin solution. The yield was 80%.

Step 3: Intermediate 6

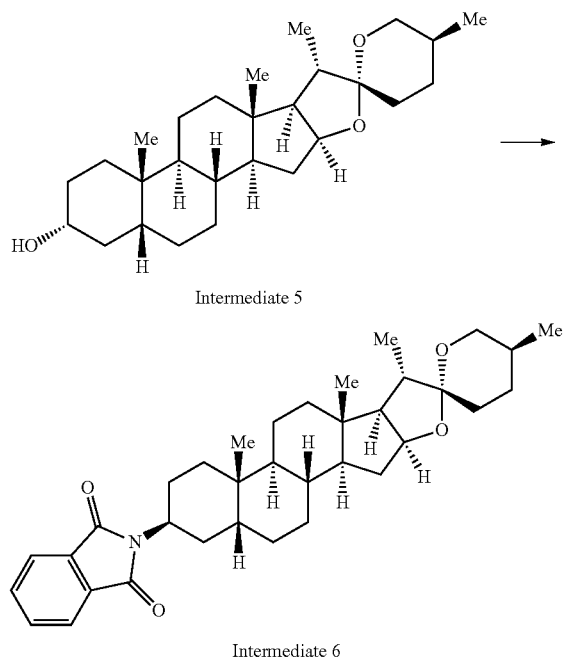

Intermediate 5

Intermediate 6

In argon atmosphere, 0.2 g of intermediate 5, 0.14 g of phthalimide and 0.25 g of PPh$_3$ were dissolved in 4 mL of anhydrous THF. After 5 minutes of stirring in ice bath, 0.19 g of DIAD was slowly added dropwise and the reaction system was stirred for another 10 minutes. Then the reaction system was removed from ice bath and incubated at room temperature for 3 hours. The solution was concentrated, and extraction was performed with water/dichloromethane. The extract was purified by silica gel column chromatography (PE:EA=45:1) and preparative thin layer chromatography (PE:EA=15:1). The reaction was monitored using vanillin solution. The yield was 50%.

Step 4: Intermediate 7

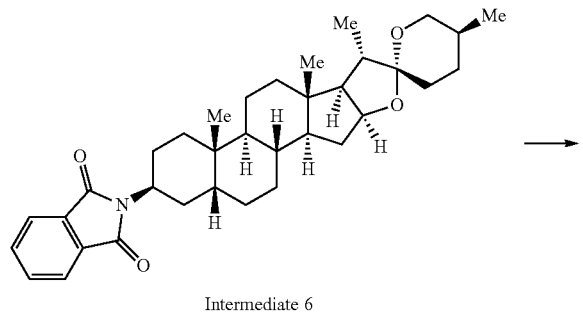

Intermediate 6

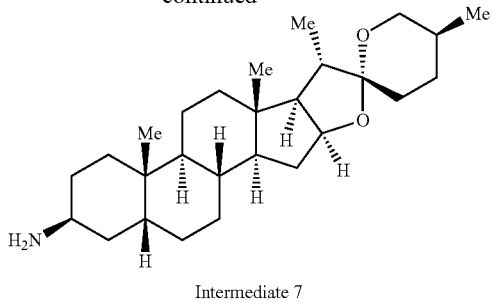

Intermediate 7

0.13 g of intermediate 6 and 0.072 g of N$_2$H$_4$·H$_2$O were dissolved with 10 mL of MeOH and the reaction system was stirred at 55° C. overnight. The solution was concentrated, and extraction was performed with water/dichloromethane; the organic layer was concentrated to give a product, which was directly used in the next reaction. The reaction was monitored using vanillin solution. The yield was 90%.

Step 5: Example 1A (QBHN0174A)

Intermediate 7

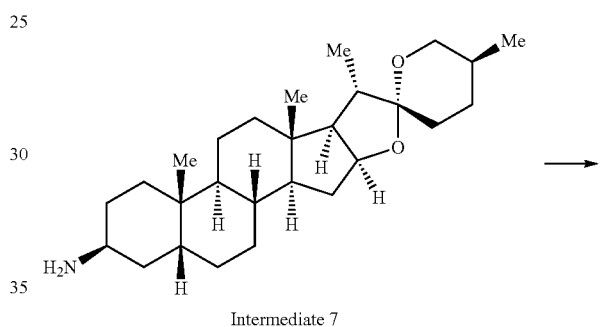

Example 1A

In argon atmosphere, 0.07 g of intermediate 7, 0.058 g of 3-(4-methylpiperazin-1-yl)-propionic acid, 0.065 g of EDC and 0.01 g of DMAP were dissolved in 4 mL of dichloromethane. The reaction system was incubated at room temperature for 4 hours. Extraction was performed with sodium bicarbonate solution/dichloromethane, and the extract was purified through an alkaline alumina column (PE:EA=1:1). The reaction was monitored using vanillin solution, and the yield was 65%.

NMR: $^1$H NMR (400 MHz, CDCl$_3$) δ 8.85 (d, J=6.9 Hz, 1H), 4.41 (dd, J=13.0, 6.6 Hz, 1H), 4.18 (s, 1H), 3.95 (d, J=10.6 Hz, 1H), 3.30 (d, J=11.6 Hz, 1H), 3.01-2.20 (brs, 8H), 2.62 (d, J=3.0 Hz, 2H), 2.39 (s, 2H), 2.30 (s, 3H), 1.23-2.07 (m, 27H), 1.08 (d, J=6.7 Hz, 3H), 1.05-0.93 (m, 6H), 0.76 (s, 3H).

Example 1B (QBHN0174B)

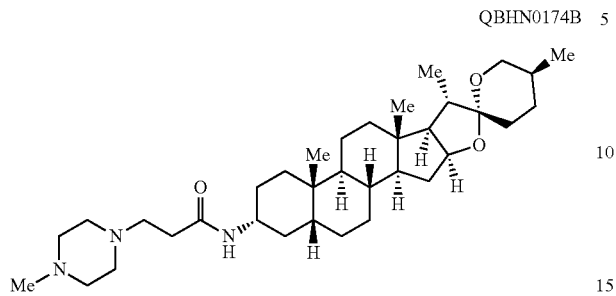

QBHN0174B

The specific preparation process of QBHN0174B is as follows:

Step 1: Intermediate 8

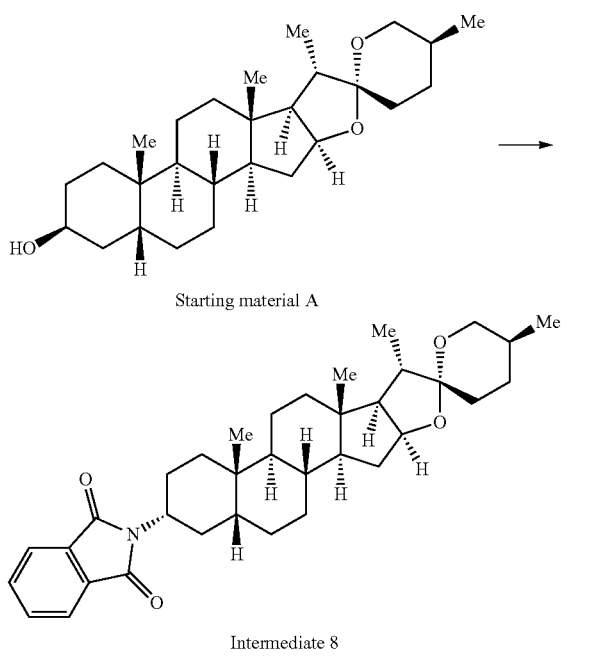

With material A as a starting material, intermediate 8 was obtained under the same conditions as in step 3 of Example 1A, and the yield was 50%.

Step 2: Intermediate 9

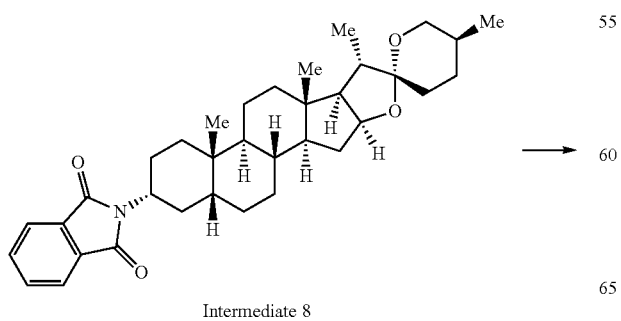

In this step, with intermediate 8 as a starting material, intermediate 9 was obtained under the same conditions as in step 4 of Example 1A, and the yield was 90%.

Step 3: Example 1B (QBHN0174B)

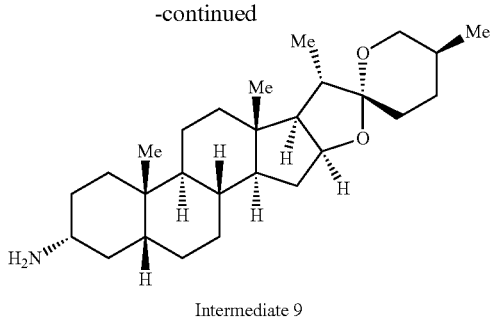

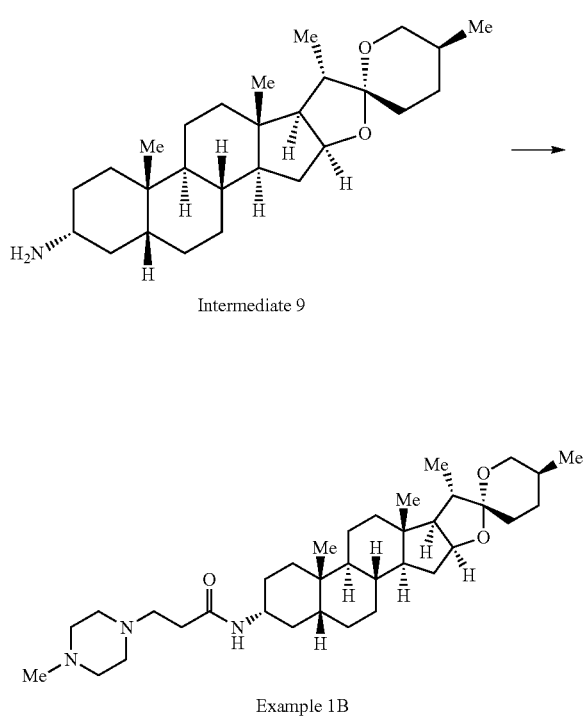

In this step, with intermediate 9 and 3-(4-methylpiperazin-1-yl)-propionic acid as starting materials, example 1B (QBHN0174B) was obtained under the same conditions as in step 5 of example 1A, and the yield was 65%.

NMR: $^1$H NMR (400 MHz, CDCl$_3$) δ 8.15 (d, J=7.6 Hz, 1H), 4.33 (dd, J=14.8, 7.5 Hz, 1H), 3.88 (dd, J=10.9, 2.4 Hz, 1H), 3.65 (m, 1H), 3.23 (d, J=10.9 Hz, 1H), 2.90-2.10 (brs, 8H), 2.56 (t, J=6.2 Hz, 2H), 2.26 (m, 2H), 2.24 (s, 3H), 1.23-2.07 (m, 27H), 1.01 (d, J=7.1 Hz, 3H), 0.95-0.83 (m, 6H, 0.69 (s, 3H).

Example 2 (QBHN0173)

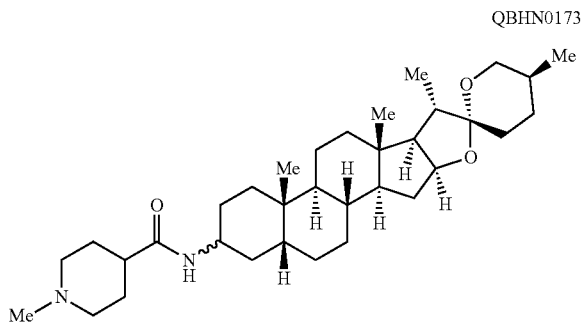

QBHN0173

With intermediate 3 and 1-methylpiperidin-4-formic acid as starting materials, example 2 (QBHN0173) was obtained under the same conditions as in procedures described in step 4 of example 1.

NMR: $^1$HNMR(CDCl$_3$, 400 MHz): δ 0.75 (s, 3H), 0.80-2.70 (m, 43H), 2.95-4.00 (m, 7H), 4.40-4.55 (m, 1H), 6.05 (s, 1H); MS: [M+1]541.5

Example 3 (QBHN0177)

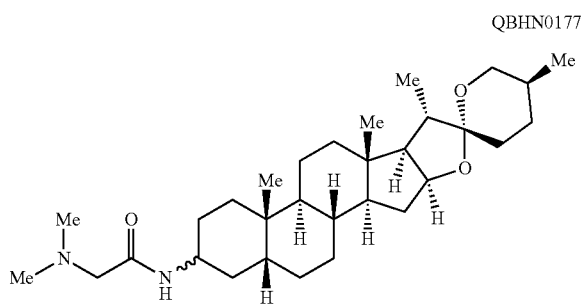

QBHN0177

With intermediate 3 and N,N-dimethylglycine as starting materials, example 3 (QBHN0177) was obtained under the same conditions as in procedures described in step 4 of example 1.

NMR: $^1$HNMR(CDCl$_3$, 400 MHz): δ 0.76 (s, 3H), 0.80-2.20 (m, 36H), 2.29 (s, 3H), 2.31 (s, 3H), 2.80-3.00 (m, 2H), 3.20-3.35 (s, 1H), 3.85-4.40 (m, 3H), 7.10-7.40 (m, 1H); MS: [M+1]501.3

Example 4 (QBHN0178)

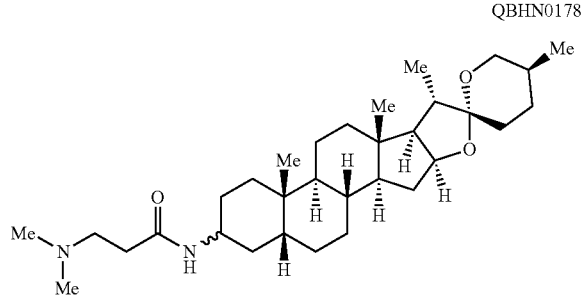

QBHN0178

With intermediate 3 and N,N-dimethyl-B-alanine as starting materials, example 4 (QBHN0178) was obtained under the same conditions as in procedures described in step 4 of example 1.

NMR: $^1$HNMR(CDCl$_3$, 400 MHz): δ 0.76 (s, 3H), 0.80-2.20 (m, 36H), 2.32 (s, 3H), 2.36 (s, 3H), 2.45-2.70 (m, 4H), 3.25-3.40 (m, 1H), 3.80-4.45 (m, 3H), 8.90-9.10 (in, 1H); MS: [M+1]515.3

Example 4A (QBHN0178A)

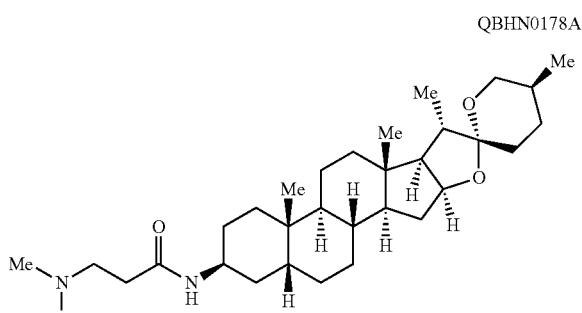

QBHN0178A

With intermediate 7 and N,N-dimethyl-B-alanine as starting materials, example 4A (QBHN0178A) was obtained under the same conditions as in procedures described in step 5 of example 1A.

$^1$H NMR (400 MHz, CDCl$_3$) δ 9.20 (d, J=7.8 Hz, 1H), 4.41 (dd, J=14.1, 7.6 Hz, 1H), 4.19 (d, J=7.2 Hz, 1H), 3.95 (dd, J=11.0, 2.5 Hz, 1H), 3.30 (d, J=10.9 Hz, 1H), 2.59-2.50 (m, 2H), 2.38-2.33 (m, 2H), 2.30 (s, 6H), 1.23-2.07 (m, 27H), 1.08 (d, J=7.1 Hz, 3H), 1.02-0.92 (m, 6H), 0.76 (s, 3H).

Example 4B (QBHN0178B)

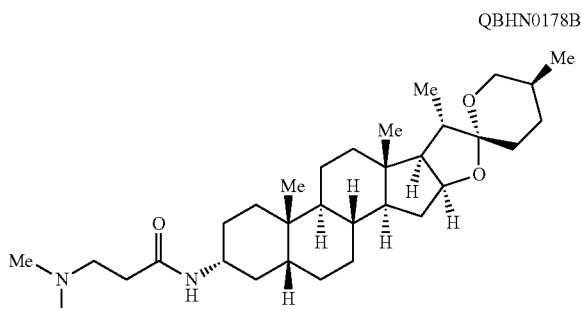

QBHN0178B

With intermediate 9 and N,N-dimethyl-B-alanine as starting materials, example 4B (QBHN0178B) was obtained under the same conditions as in procedures described in step 5 of example 1A.

$^1$H NMR (400 MHz, CDCl$_3$) δ 7.77 (d, J=7.2 Hz, 1H), 4.41 (dd, J=14.1, 7.5 Hz, 1H), 3.95 (dd, J=10.9, 2.3 Hz, 1H), 3.78-3.65 (m, 1H), 3.30 (d, J=11.0 Hz, 1H), 2.53 (t, J=6.2 Hz, 2H), 2.32 (t, J=6.2 Hz, 2H), 2.27 (s, 6H), 1.23-2.07 (m, 27H), 1.08 (d, J=7.1 Hz, 3H), 1.02-0.93 (m, 6H), 0.76 (s, 3H).

Example 5 (QBHN0180)

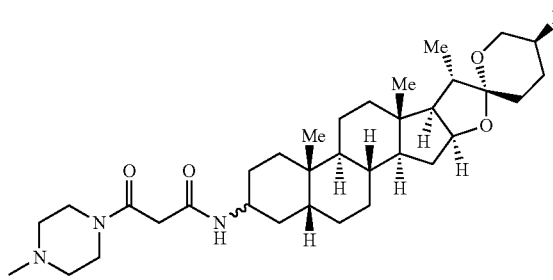

With intermediate 3 and 3-oxo-3-(4-methylpiperazin-1-yl)propionic acid as starting materials, example 5 (QBHN0180) was obtained under the same conditions as in procedures described in step 4 of example 1.

NMR: $^1$HNMR(CDCl$_3$, 400 MHz): δ 0.76 (s, 3H), 0.80-2.20 (m, 36H), 2.40 (s, 3H), 2.55-2.70 (m, 4H), 3.25-4.20 (m, 9H), 4.45-4.55 (m, 1H); MS: [M+1]584.3

Example 6 (QBHN0185)

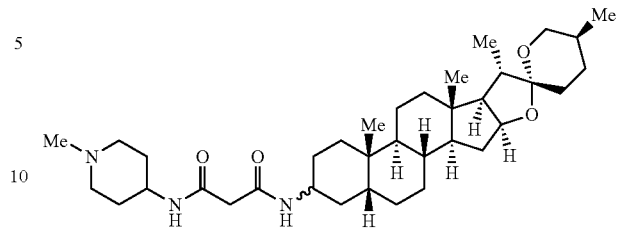

With intermediate 3 and 3-oxo-3-(1-methylpiperazin-4-amino)propionic acid as starting materials, example 6 (QBHN0185) was obtained under the same conditions as in procedures described in step 4 of example 1.

NMR: $^1$HNMR(CDCl$_3$, 400 MHz): δ 0.76 (s, 3H), 0.80-2.20 (m, 40H), 2.75-3.70 (m, 12H), 3.25-3.70 (m, 2H), 3.84-4.40 (m, 3H), 7.60-7.80 (m, 5H); MS: [M+1]598.3

Example 7 (QBHN0186)

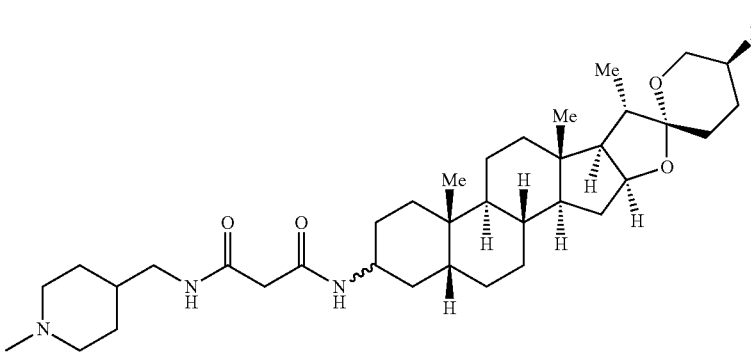

With intermediate 3 and 3-oxo-3-(1-methylpiperidin-4-methylamino)propionic acid as starting materials, example 7 (QBHN0186) was obtained under the same conditions as in procedures described in step 4 of example 1.

NMR: $^1$HNMR(CDCl$_3$, 400 MHz): δ 0.76 (s, 3H), 0.80-2.30 (m, 41H), 2.75-3.00 (m, 4H), 3.25-3.70 (m, 11H), 3.84-4.40 (m, 2H), 7.60-7.70 (m, 1H); MS: [M+1]612.3

Example 8 (QBHN0187)

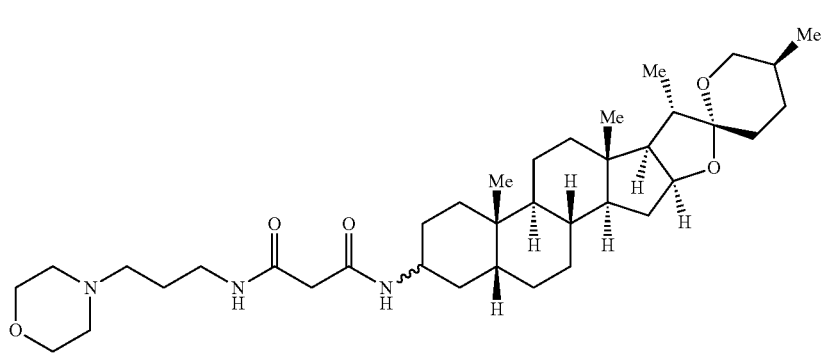

With intermediate 3 and 3-oxo-3-(3-morpholinopropyl) aminopropionic acid as starting materials, example 8 (QBHN0187) was obtained under the same conditions as in procedures described in step 4 of example 1.

NMR: ¹HNMR(CDCl₃, 400 MHz): δ 0.75 (s, 3H), 0.80-2.30 (m, 38H), 2.45-2.60 (m, 4H), 3.25-4.00 (m, 13H), 4.10-4.55 (m, 2H), 7.60-7.80 (m, 1H); MS: [M+1]628.3

Example 9 (QBHN0190)

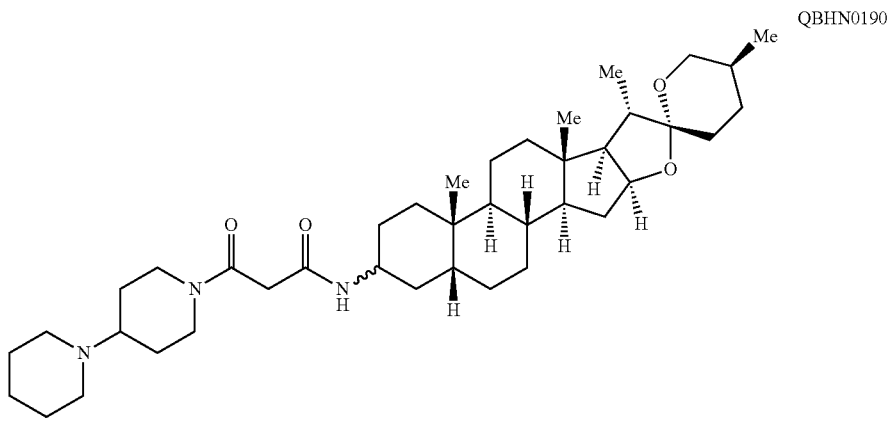

With intermediate 3 and 3-oxo-3-(1,4-dipiperidin-1-yl) propionic acid as starting materials, example 9 (QBHN0190) was obtained under the same conditions as in procedures described in step 4 of example 1.

NMR: ¹HNMR(CDCl₃, 400 MHz, ppm): δ 0.76 (s, 3H), 0.80-2.30 (m, 46H), 2.55-3.60 (m, 10H), 3.75-4.55 (m, 5H), 7.20-7.40 (m, 1H); MS: [M+1]652.3

Example 10 (QBHN0191)

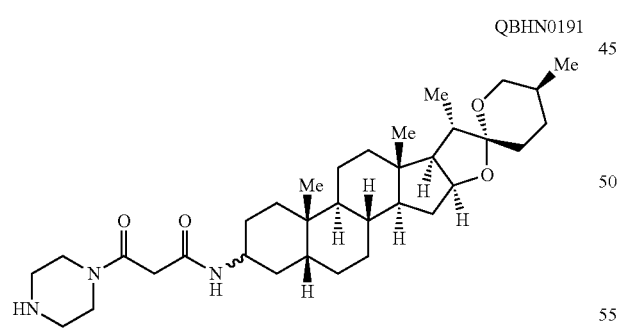

With intermediate 3 and 3-oxo-3-(piperazin-1-yl)propionic acid as starting materials, example 10 (QBHN0191) was obtained under the same conditions as in procedures described in step 4 of example 1.

NMR: ¹HNMR(CDCl₃, 400 MHz): δ 0.77 (s, 3H), 0.80-2.20 (m, 36H), 2.85-4.00 (m, 13H), 4.40-4.55 (m, 1H), 7.40-7.40 (m, 1H); MS: [M+1]570.3

Example 11 (QBHN0192)

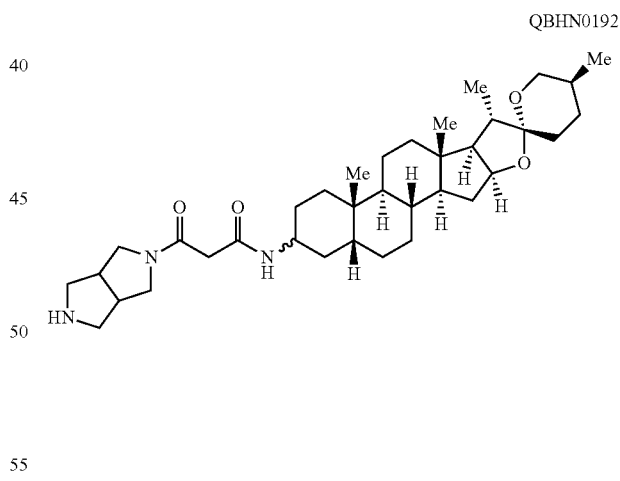

With intermediate 3 and 3-(hexahydropyrrolo[3,4-c]pyrrol-2(1H)-yl)-3-oxopropanoic acid as starting materials, example 11 (QBHN0192) was obtained under the same conditions as in procedures described in step 4 of example 1.

NMR: ¹HNMR(CDCl₃, 400 MHz): δ 0.76 (s, 3H), 0.80-2.20 (m, 38H), 2.95-4.00 (m, 13H), 4.40-4.55 (m, 1H), 7.20-7.50 (m, 2H); MS: [M+1]596.4

Example 12 (QBHN0199)

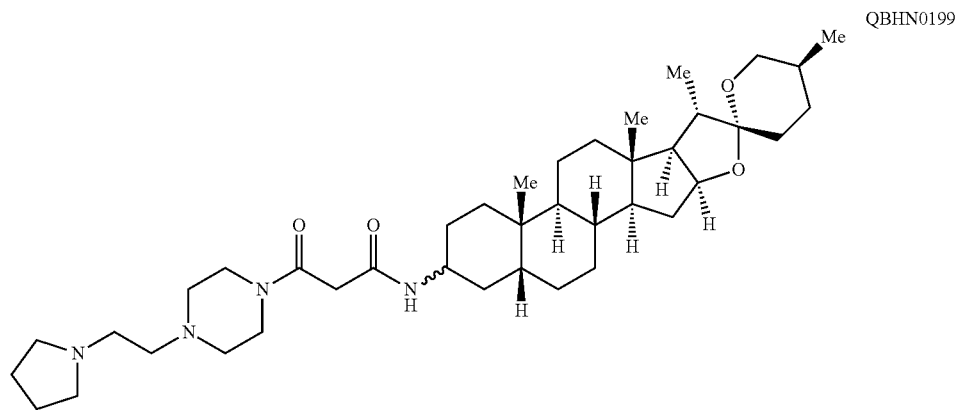

With intermediate 3 and 3-oxo-3-(4-(2-(pyrrolidin-1-yl)ethyl)piperazin-1-yl)propanoic acid as starting materials, example 12 (QBHN0199) was obtained under the same conditions as in procedures described in step 4 of example 1.

NMR: $^1$HNMR(CDCl$_3$, 400 MHz): δ 0.74 (s, 3H), 0.80-2.30 (m, 36H), 2.45-2.80 (m, 8H), 3.25-4.00 (m, 11H), 4.10-4.45 (m, 2H); MS: [M+1]667.5

Example 13. Compound Activity Assay

Study of CTG Cell Proliferation—Inhibition of In-Vitro Growth of Various Tumor Cells by Sarsasapogenin Derivative Tumor cells included: human A549 cells (lung cancer cells) (ATCC, Catalog No. CCL-185), HeLa cells (cervical cancer cells) (ATCC, Catalog No. CCL-2), HepG2 cells (liver cancer cells) (ATCC, Catalog No. HB-8065), A375 cells (melanoma cells) (ATCC, Catalog No. CRL-1619), MCF-7 (breast cancer cell) (ATCC, Catalog No. HTB-22), U87MG (brain glioma cell) (ATCC, Catalog No. HTB-14), LN229 (ATCC, Catalog No. CRL-2611), A172 (ATCC, Catalog No. CRL-1620), KNS-42 (JCRB, Catalog No. IF050356), BE(2)-C (ATCC, Catalog No. CRL-2268), U118MG (ATCC, Catalog No. HTB-15), SW-1088 (ATCC, Catalog No. HTB-12), and SH-SY5Y (CLS, Catalog No. 300154).

The specific process is as follows:

The aforementioned tumor cells were inoculated into clear-bottom white 96-well culture plates (Corning, Catalog No. CLS3903) containing specific medium at 1.8 to 15×10$^3$ cells per well, and were incubated in an incubator (37° C., 5% CO$_2$) for 24 hours.

A 10 mM stock solution was prepared by using DMSO (Sigma, Catalog No. D2650) for each compound, diluted with medium to required concentrations (final concentration of DMSO: 0.2%) and added into each well with 2 replicate wells/concentration. The cells were incubated in the incubator at 37° C. and 5% CO$_2$ for 72 hours. Then, 100 μL of CellTiter-Glo® cell activity assay reagent (Promega, Catalog No. G7573) was added into each well and well mixed using a shaker for 10 minutes to induce cytolysis. The 96-well plates were let stand at room temperature for 10 minutes to stabilize the luminous signals. With white bottom membranes attached to the bottoms of the culture plates, the plates were read using EnSpire system. Data were processed by XLfit software to give IC$_{50}$ values.

The inhibition of in vitro growth of the tumor cells by the sarsasapogenin derivative is shown in Table 1 and Table 2.

TABLE 1

Inhibition of in vitro growth of A549 lung cancer cells by various examples

| Example | Compound No. | A549 Lung cancer cell (% growth inhibition) | | |
|---|---|---|---|---|
| | | 10 μM | 5 μM | 1 μM |
| 1 | QBHN0173 | 87.58 | 31.13 | −5.25 |
| 2 | QBHN0174 | 99.99 | 98.11 | 95.35 |
| 3 | QBHN0177 | 98.99 | 86.22 | 1.00 |
| 4 | QBHN0178 | 100.45 | 99.05 | 18.19 |
| 5 | QBHN0180 | 95.86 | 48.32 | 1.37 |
| 6 | QBHN0185 | 99.84 | 82.20 | −6.51 |
| 7 | QBHN0186 | 99.87 | 91.65 | −0.84 |
| 8 | QBHN0187 | 93.51 | 7.71 | 36.22 |
| 9 | QBHN0190 | 97.84 | 22.89 | 2.09 |
| 10 | QBHN0191 | 99.34 | 65.78 | 5.08 |
| 11 | QBHN0192 | 97.16 | 57.31 | 3.86 |
| 12 | QBHN0199 | 98.51 | 89.57 | 4.50 |

TABLE 2

Inhibition of in vitro growth of brain tumor cells by various examples (IC$_{50}$, μM)

| Example | U87MG | LN229 | A172 | KNS-42 | BE(2)-C | U118MG | SW-1088 | SH-SY5Y |
|---|---|---|---|---|---|---|---|---|
| 2 | 1.57 | 1.58 | 2.76 | 1.59 | 3.19 | 1.87 | 0.49 | 1.56 |
| 2A | 1.56 | 1.62 | 1.66 | 1.77 | 2.85 | 1.07 | 0.66 | 2.78 |
| 2B | 4.66 | 5.52 | 3.84 | 4.78 | 7.9 | 5.17 | 2.75 | >10 |

TABLE 2-continued

Inhibition of in vitro growth of brain tumor cells by various examples (IC$_{50}$, μM)

| Example | U87MG | LN229 | A172 | KNS-42 | BE(2)-C | U118MG | SW-1088 | SH-SY5Y |
|---|---|---|---|---|---|---|---|---|
| 4 | 2.36 | 2.29 | 3.04 | 1.92 | 3.31 | 1.93 | 2.72 | 2.8 |
| QBHN0221 | 2.7 | 2.6 | 3.38 | 5.16 | 4.18 | 2.28 | 3.88 | 3.22 |

Tables 1 and 2 show that the compounds disclosed herein have high inhibitory activity on the growth of the tumor cells, particularly on various brain tumor cells (Table 2), and the activity of some compounds is better than that of the reference compound QBHN0221 (Table 2).

In this specification, the present invention has been described in reference to its specific examples. However, it is obvious that various modifications and changes can be made without departing from the spirit and scope of the present invention. Therefore, this specification should be regarded as illustrative and not restrictive.

The invention claimed is:

1. A derivative of sarsasapogenin having a structure of formula I,

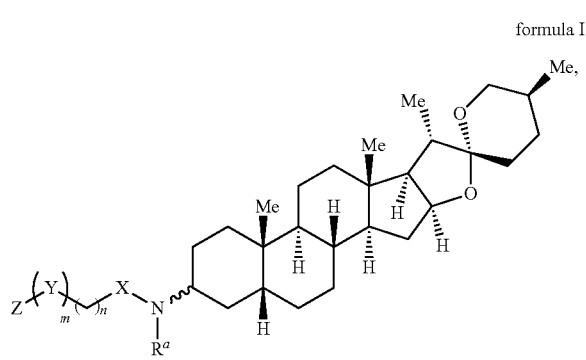

formula I wherein, Z is selected from a monoheterocyclyl, a diheterocyclyl, and NR$^1$R$^2$, where the monoheterocyclyl or diheterocyclyl contain one or two heteroatoms selected from sulfur, oxygen, and NR$^a$;

R$^1$ and R$^2$ are each independently selected from hydrogen and substituted or unsubstituted C$_1$-C$_{10}$ alkyl, or both R$^1$ and R$^2$ together the nitrogen of NR$^1$R$^2$ form a 3-8 membered ring substituted by one or more substituents selected from C$_1$-C$_{10}$ alkyl, C$_3$-C$_{10}$ cycloalkyl, C$_6$-C$_{20}$ aryl, C$_3$-C$_{14}$ heteroaryl, halogen, hydroxyl, amino, nitro, cyano, formyl, carboxyl, alkoxy, —CF$_3$, —SF$_5$ and 3-8 membered heterocyclyl containing one or more heteroatoms selected from sulfur, oxygen, and NR$^a$;

R$^a$ is independently selected from H, C$_1$-C$_{10}$ alkyl, C$_3$-C$_{10}$ cycloalkyl, C$_6$-C$_{20}$ aryl and C$_3$-C$_{14}$ heteroaryl optionally substituted with at least one substituent selected from halogen, hydroxyl, amino, nitro, cyano, formyl, carboxyl, alkoxy, —CF$_3$, and —SF$_5$;

X is selected from C(O) and S(O)$_2$;

Y is selected from C(R$^d$)(R$^e$), C(O), and S(O)$_2$, wherein R$^d$ and R$^e$ are independently selected from H, C$_1$-C$_{10}$ alkyl, C$_3$-C$_{10}$ cycloalkyl, C$_6$-C$_{20}$ aryl and C$_3$-C$_{14}$ heteroaryl, optionally substituted with at least one substituent selected from halogen, hydroxyl, amino, nitro, cyano, formyl, carboxyl, alkoxy, —CF$_3$, and —SF$_5$; or R$^d$ and R$^e$ together with the carbon atom they are attached to, form a 3-8 membered ring; and n is an integer selected from 0 to 10, and m is an integer selected from 0 and 1, with the proviso that m and n cannot both be 0;

or an enantiomer, diastereomer, tautomer, or a pharmaceutically acceptable thereof.

2. The derivative of sarsasapogenin according to claim 1, wherein the structure of the derivative is shown by formula II:

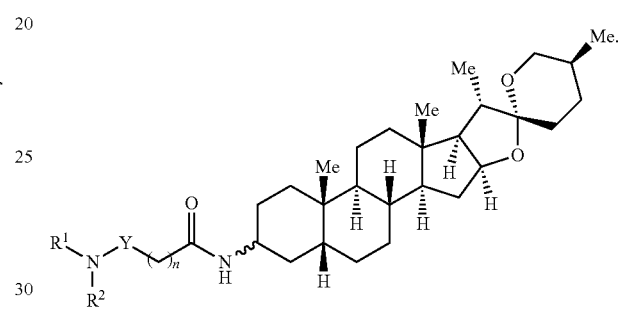

3. The derivative of sarsasapogenin according to claim 1, wherein the structure of the derivative is shown by formula III:

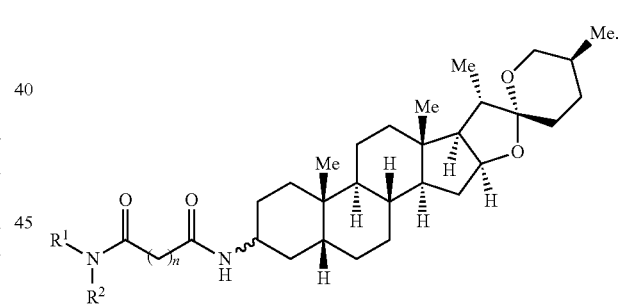

4. The derivative of sarsasapogenin according to claim 1, wherein the structure of the derivative is shown by formula IV:

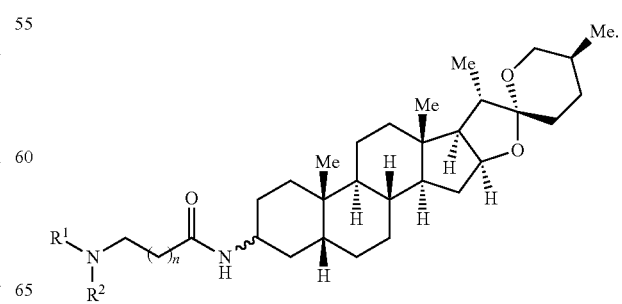

5. The derivative of sarsasapogenin according to claim 1, wherein the derivative is selected from the group consisting of:
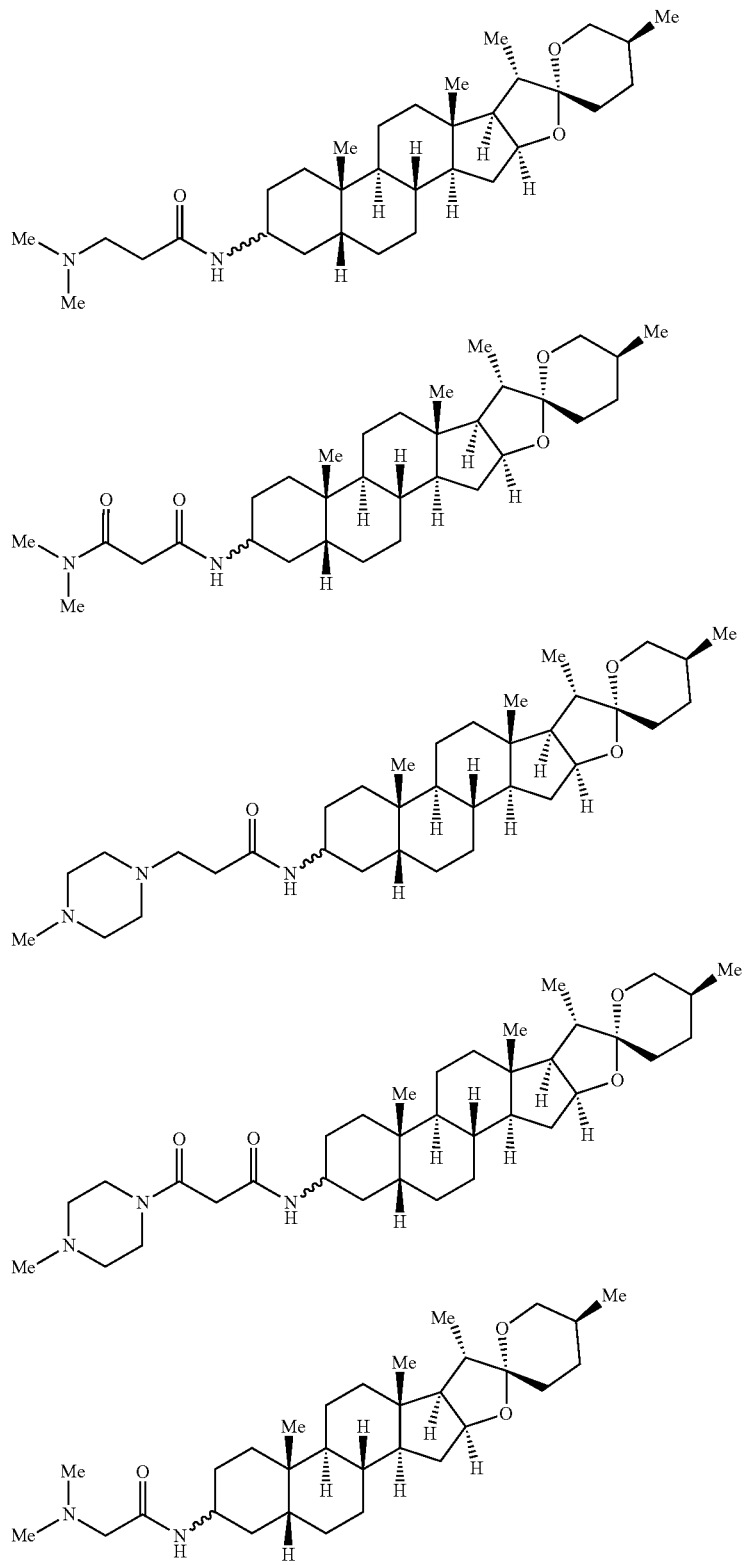

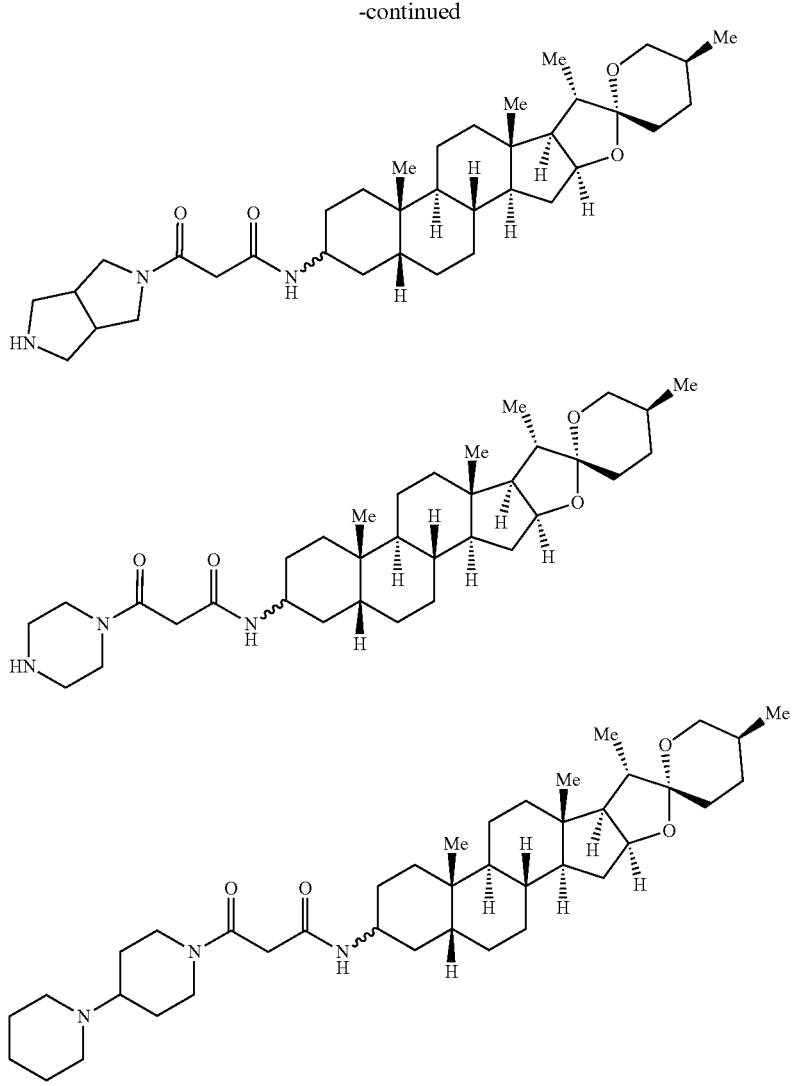
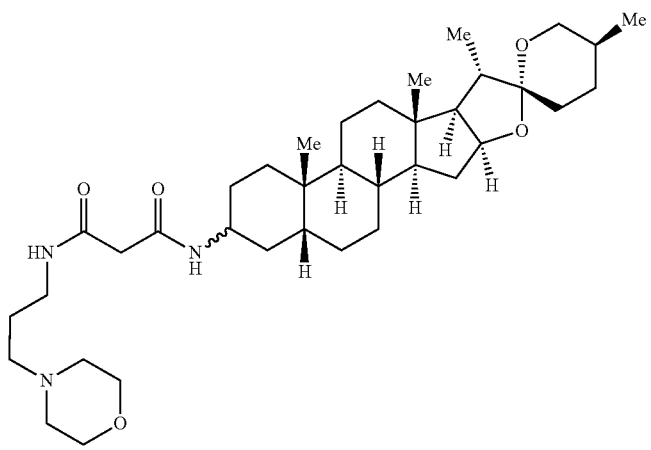
and

-continued

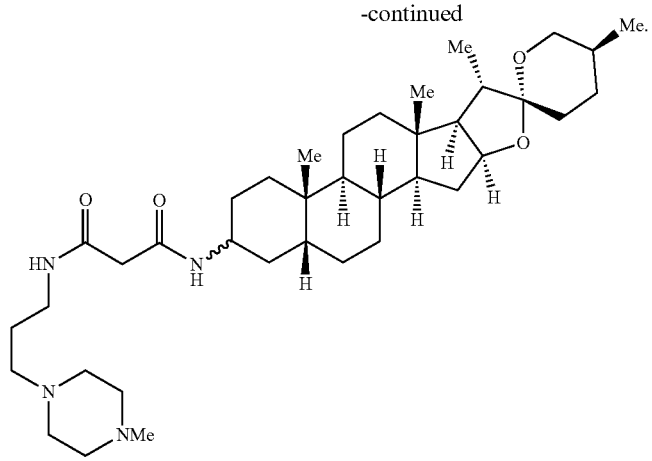

6. A deuterated derivative of sarsasapogenin, wherein one or more hydrogen atoms of the derivative of sarsasapogenin of claim 1 are replaced by deuterium.

7. A pharmaceutical composition, comprising
   a derivative of sarsasapogenin according to claim 1, or a pharmaceutically acceptable salt thereof; and
   a second ingredient which is an anti-tumor agent selected from one or more of a chemotherapeutic agent, a targeted agent against tumor and an anti-tumor antibody.

8. The pharmaceutical composition according to claim 7, wherein the pharmaceutically acceptable salt is selected from one or more of hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and the anti-tumor agent is selected from one or more of PD-1 antibody, CTLA-4 antibody, PD-L1 antibody and PD-L2 antibody.

9. The derivative of sarsasapogenin according to claim 2, wherein the structure of the derivative is shown by formula IV:

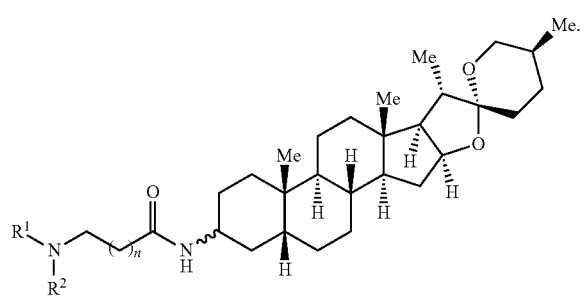

10. The derivative of sarsasapogenin according to claim 1, wherein Y is selected from $C(R^d)(R^e)$, $C(O)$, and $S(O)_2$, wherein $R^d$ and $R^e$ are independently selected from $C_1$-$C_{10}$ alkyl, $C_3$-$C_{10}$ cycloalkyl, $C_6$-$C_{20}$ aryl and $C_3$-$C_{14}$ heteroaryl optionally substituted with at least one substituent selected from halogen, hydroxyl, amino, nitro, cyano, formyl, carboxyl, alkoxy, —$CF_3$, and —$SF_5$; or $R^d$ and $R^e$, together with the carbon atom they are attached to, form a 3-8 membered heterocyclyl containing one or two heteroatoms selected from sulfur, oxygen, and $NR^a$.

11. A deuterated derivative of sarsasapogenin, wherein one or more hydrogen atoms of the derivative of sarsasapogenin of claim 2 are replaced by deuterium.

12. A deuterated derivative of sarsasapogenin, wherein one or more hydrogen atoms of the derivative of sarsasapogenin of claim 3 are replaced by deuterium.

13. A deuterated derivative of sarsasapogenin, wherein one or more hydrogen atoms of the derivative of sarsasapogenin of claim 4 are replaced by deuterium.

14. A deuterated derivative of sarsasapogenin, wherein one or more hydrogen atoms of the derivative of sarsasapogenin of claim 5 are replaced by deuterium.

15. The pharmaceutical composition according to claim 7, comprising a derivative of sarsasapogenin of formula II:

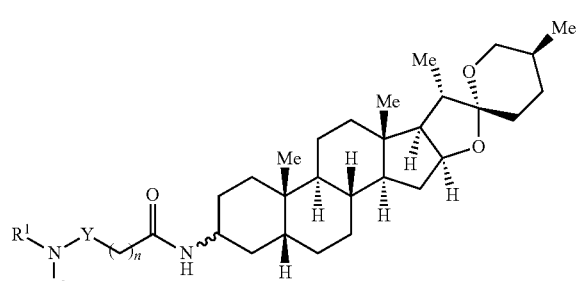

or a pharmaceutically acceptable salt thereof; and
   wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and
   the anti-tumor agent is selected from the group consisting of: PD-1 antibody, CTLA-4 antibody, PD-L1 antibody and PD-L2 antibody.

16. The pharmaceutical composition according to claim 7, comprising a derivative of sarsasapogenin of formula III:

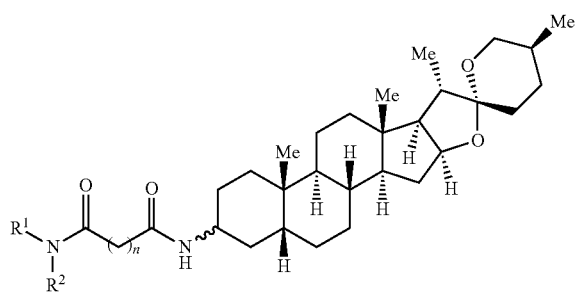

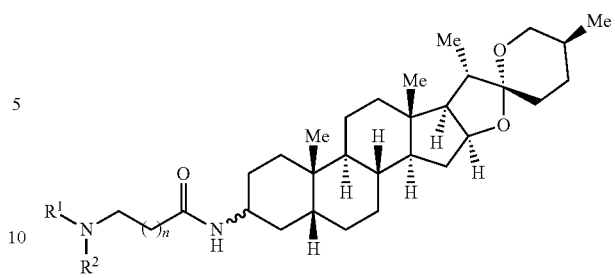

or a pharmaceutically acceptable salt thereof; and
wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and
the anti-tumor agent is selected from of the group consisting of: PD-1 antibody, CTLA-4 antibody, PD-L1 antibody and PD-L2 antibody.

17. The pharmaceutical composition according to claim 7, comprising a derivative of sarsasapogenin of formula IV:

or a pharmaceutically acceptable salt thereof; and
wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and
the anti-tumor agent is selected from the group consisting of: PD-1 antibody, CTLA-4 antibody, PD-L1 antibody and PD-L2 antibody.

18. The pharmaceutical composition according to claim 7, wherein the derivative of sarsasapogenin is selected from the group consisting of:

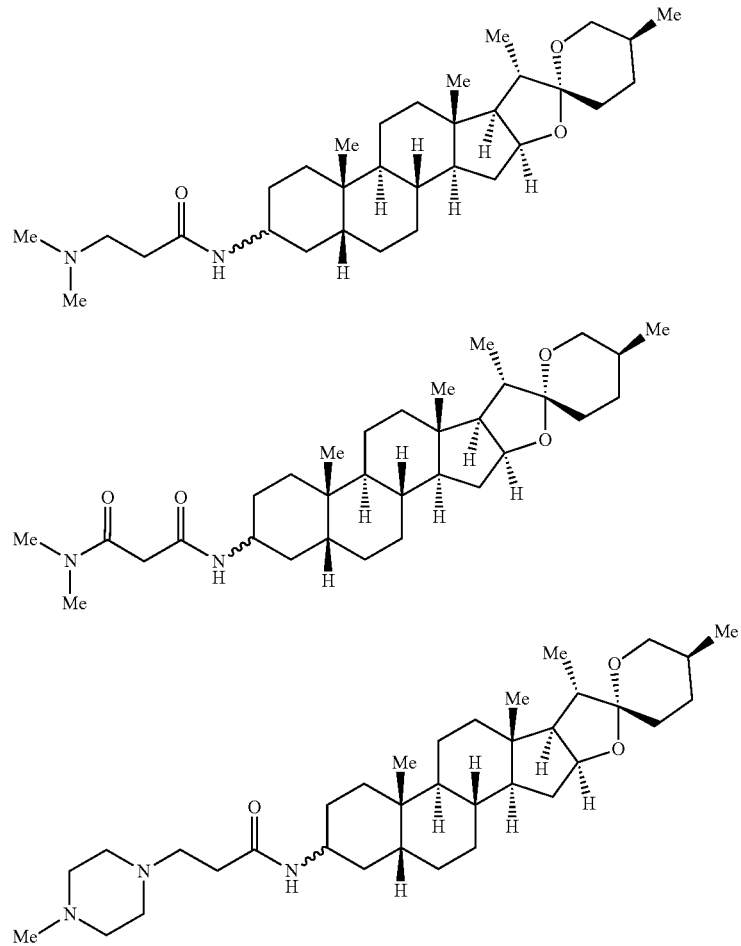

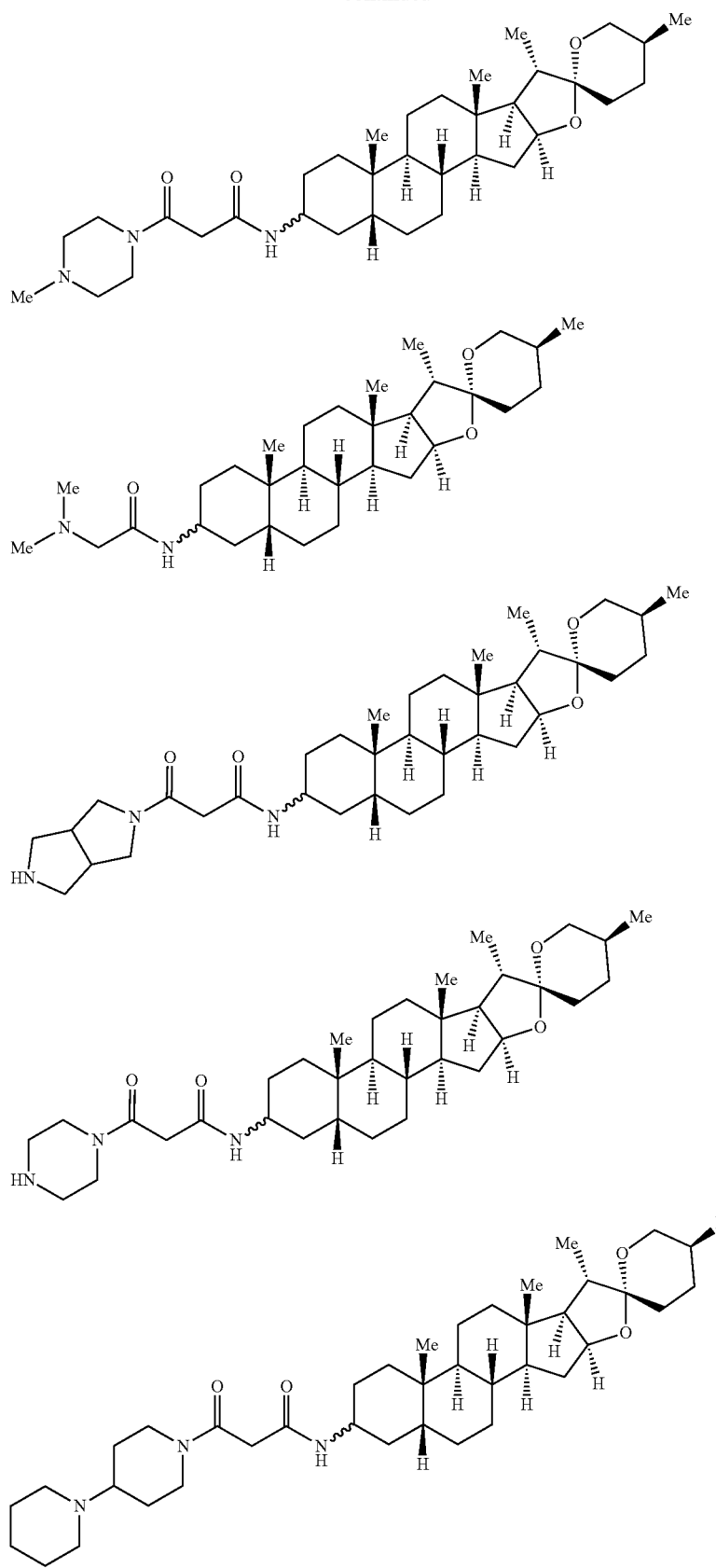

-continued

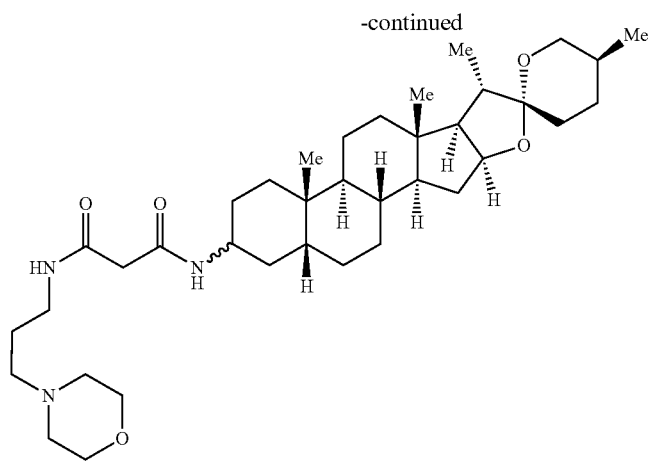

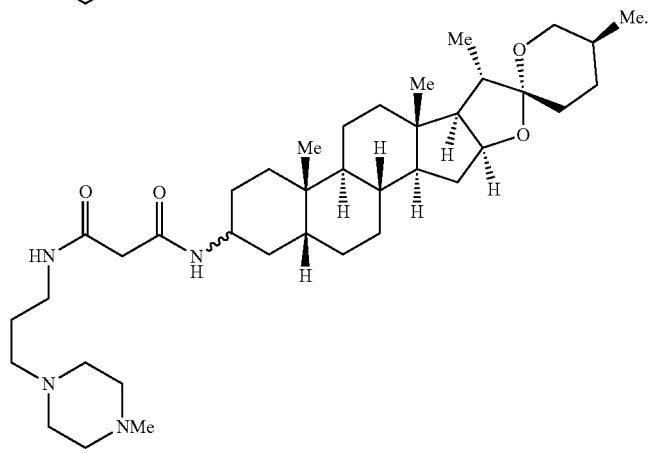

or a pharmaceutically acceptable salt thereof;
wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and
the anti-tumor agent is selected from the group consisting of: PD-1 antibody, CTLA-4 antibody, PD-L1 antibody and PD-L2 antibody.

19. A pharmaceutical composition comprising a deuterated derivative of sarsasapogenin of claim 6, or a pharmaceutically acceptable salt thereof;
wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and
the anti-tumor agent is selected from the group consisting of: PD-1 antibody, CTLA-4 antibody, PD-L1 antibody and PD-L2 antibody.

20. The derivative of sarsasapogenin according to claim 1, wherein the derivative is selected from the group consisting of:

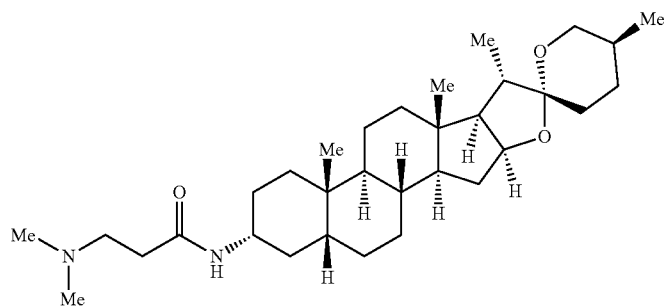

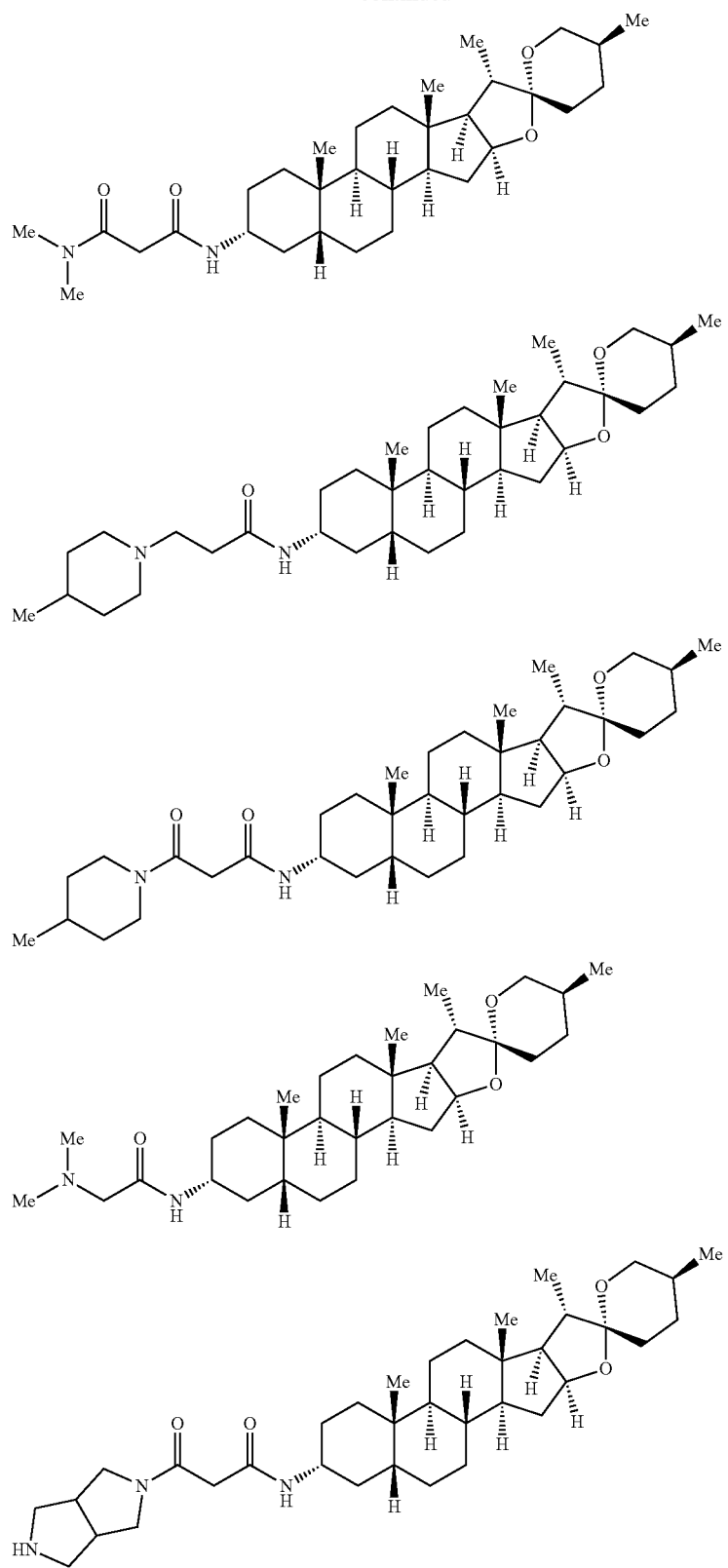

-continued
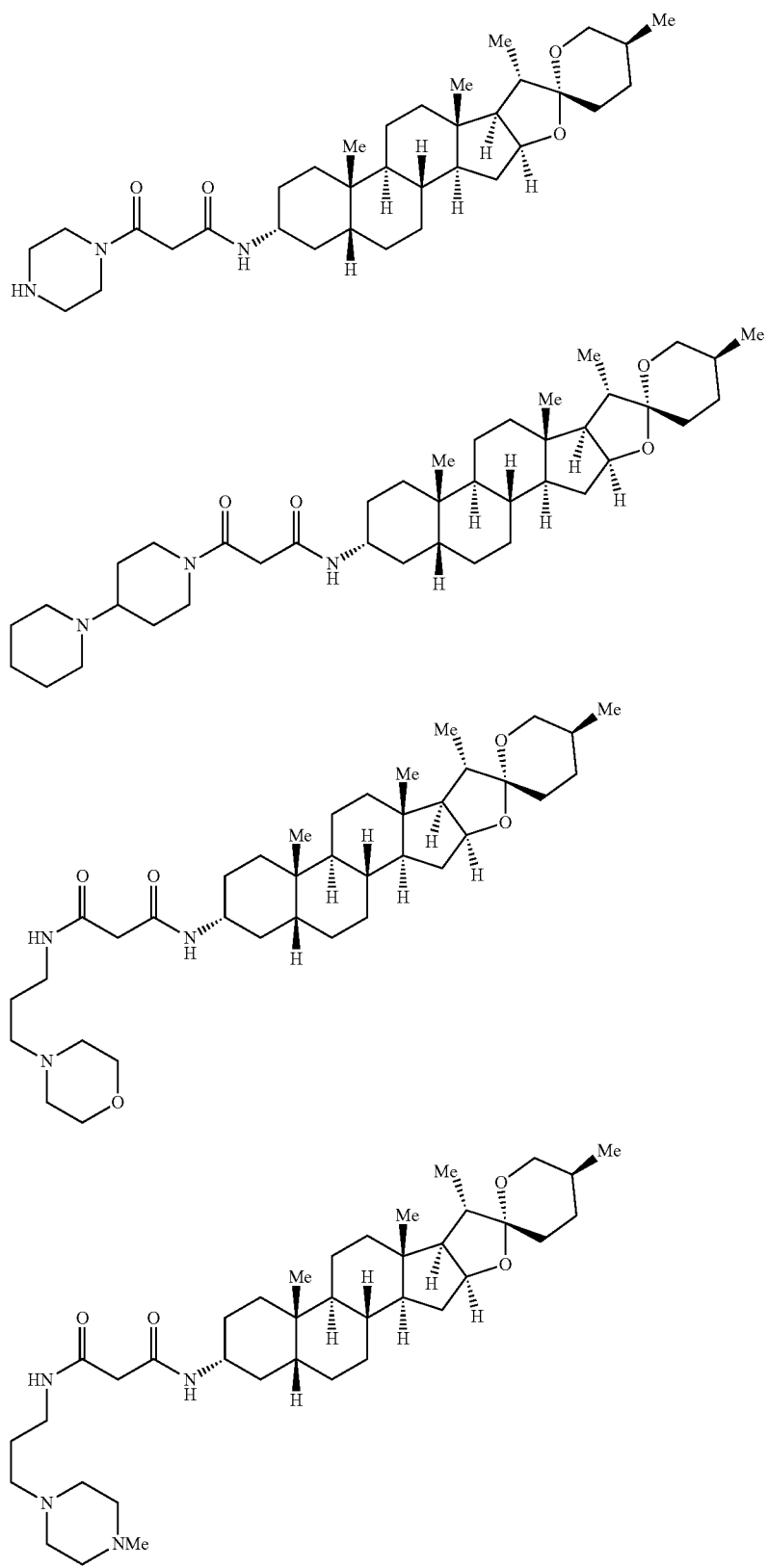

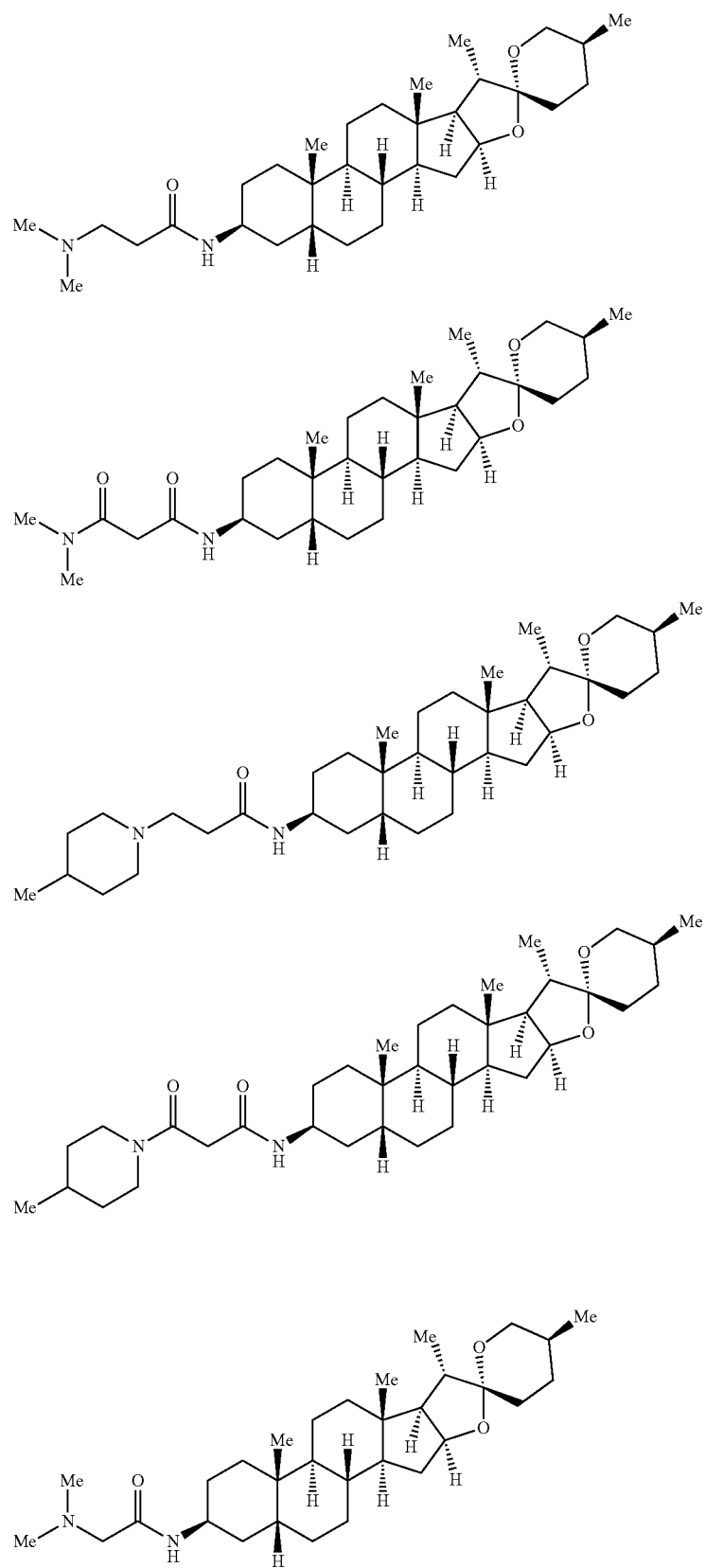

-continued
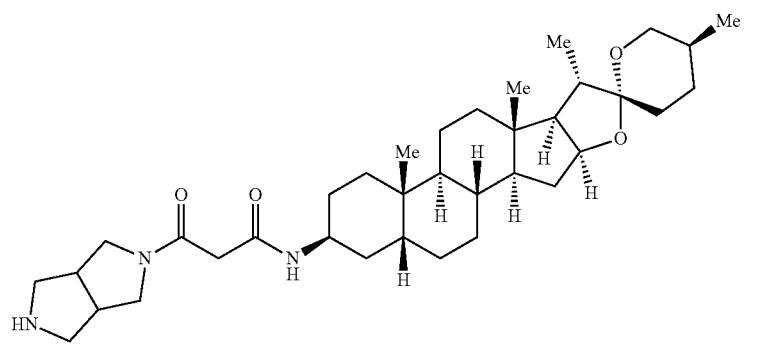
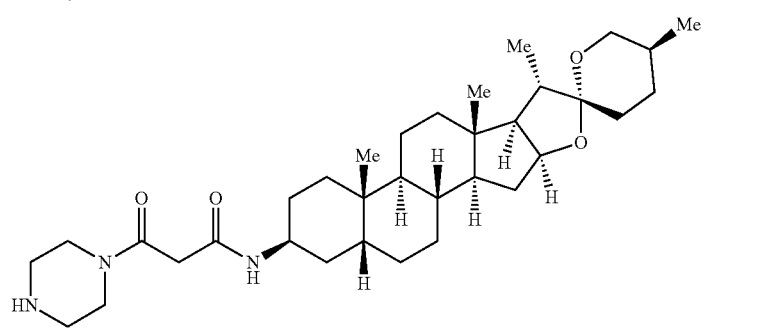
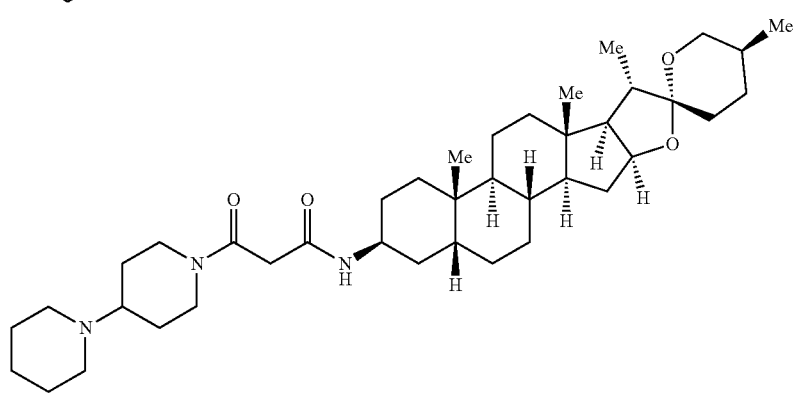
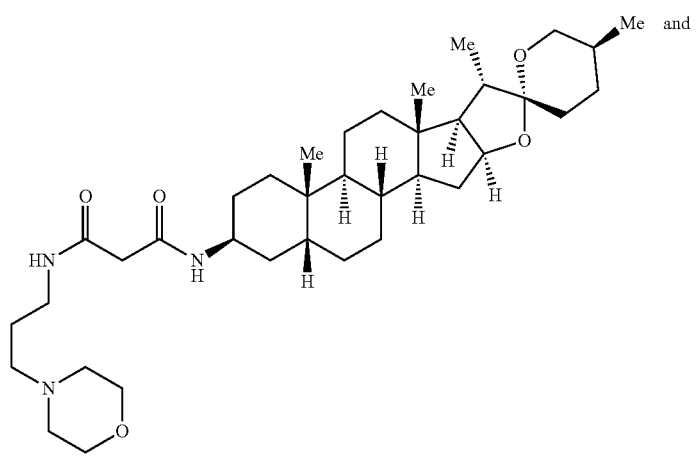
and

-continued
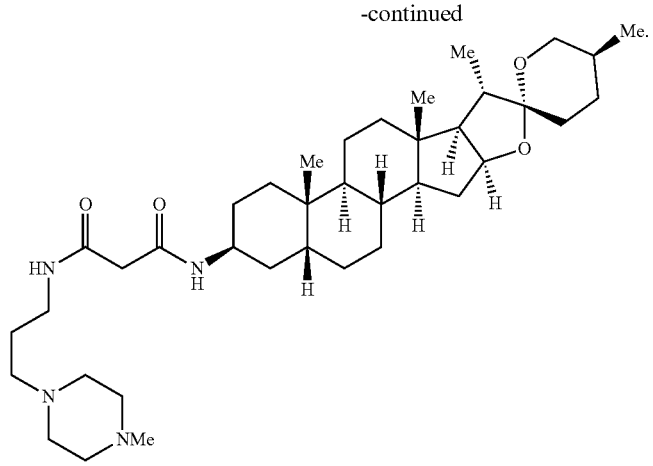
21. The pharmaceutical composition according to claim 7, wherein the derivative of sarsasapogenin is selected from the group consisting of:
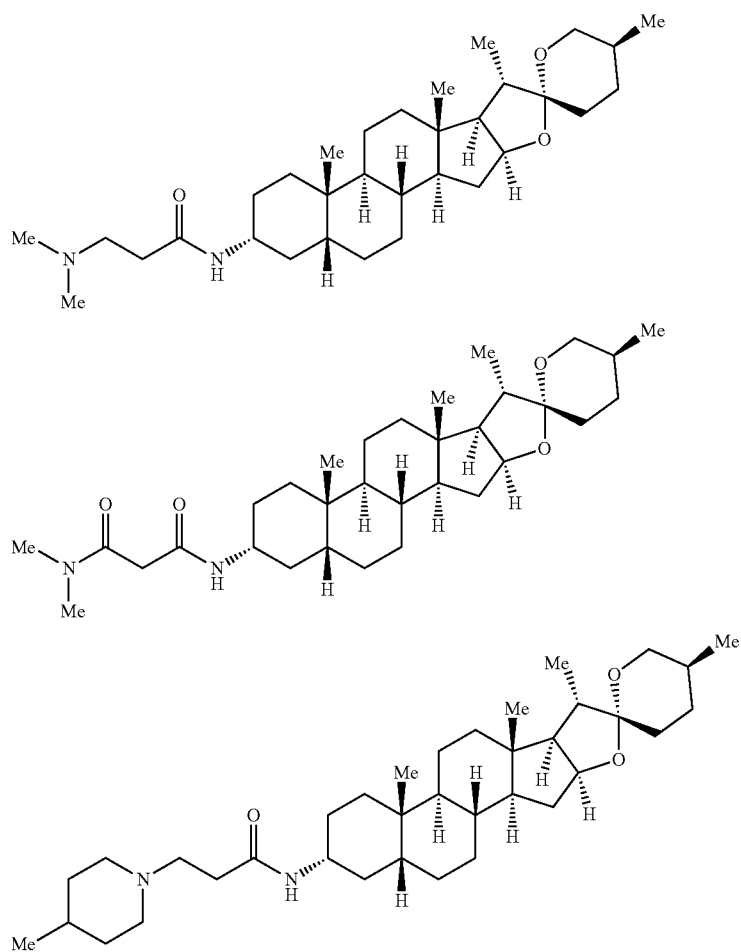

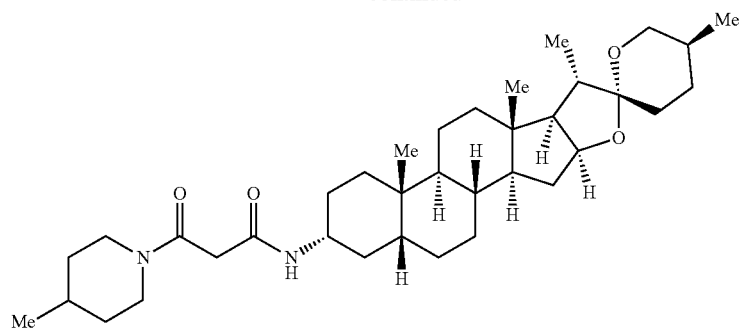
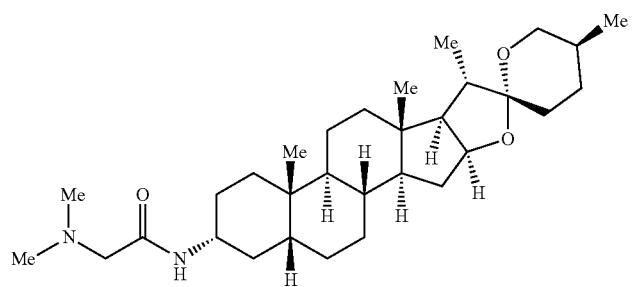
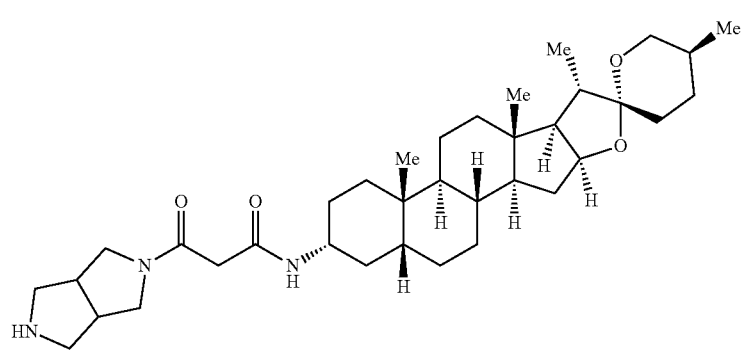
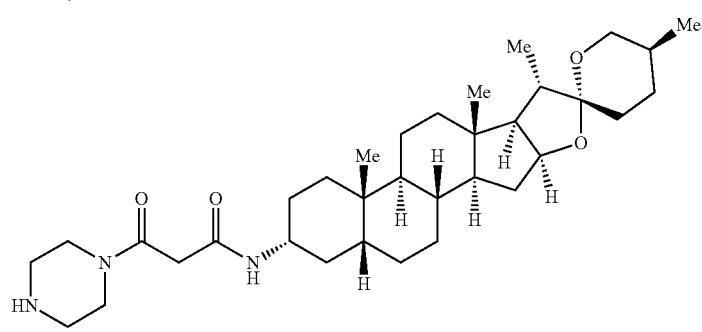
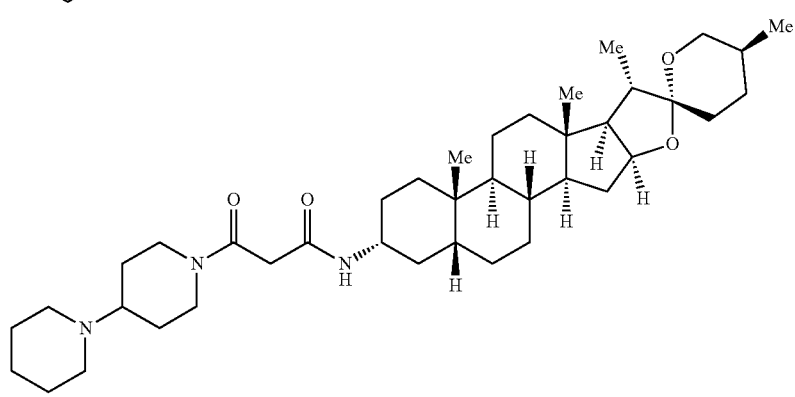

-continued
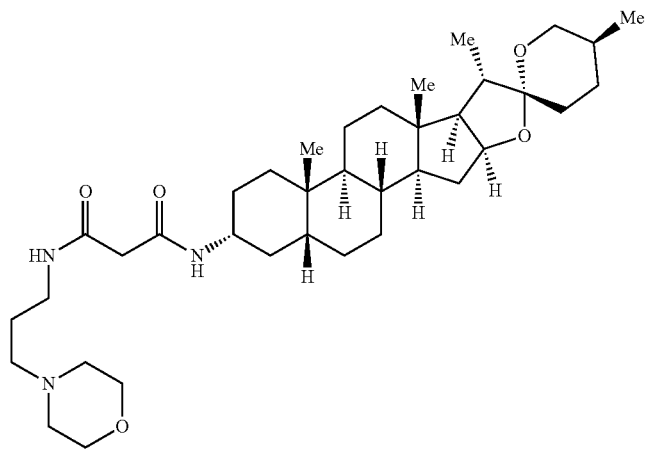
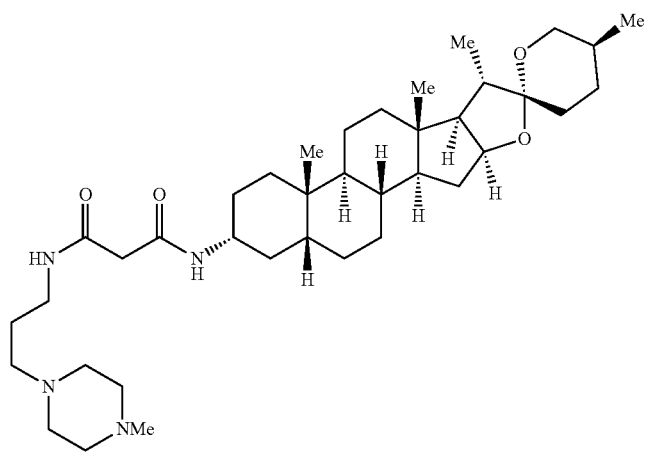
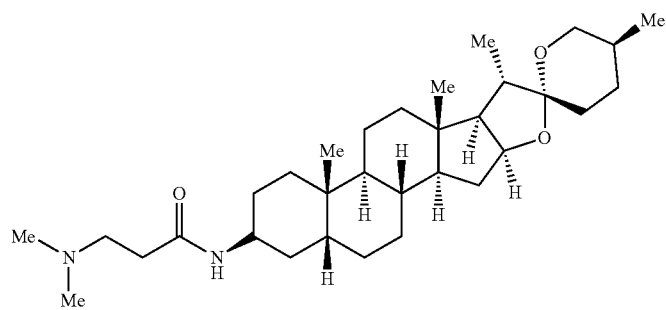
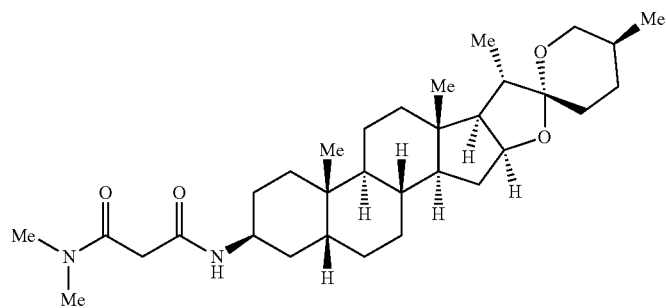

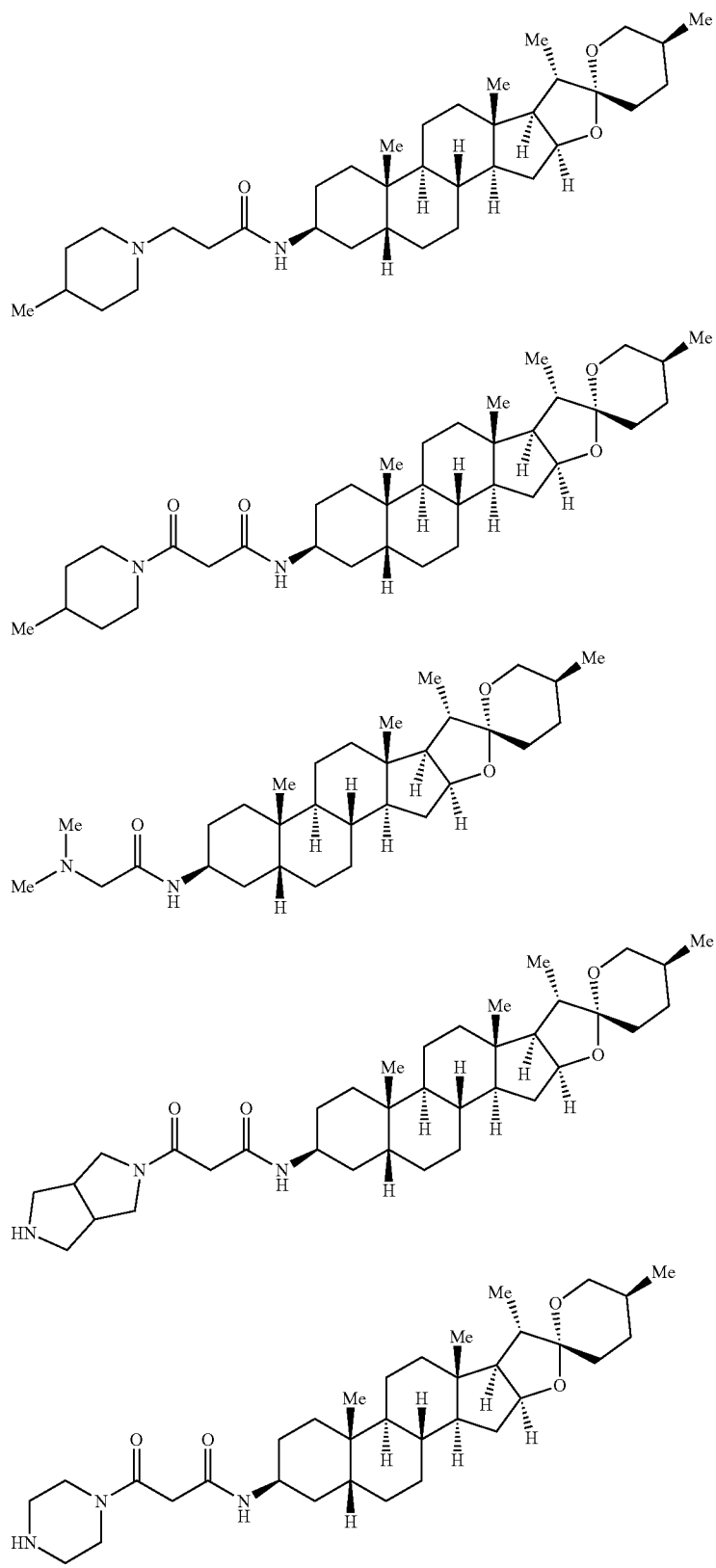

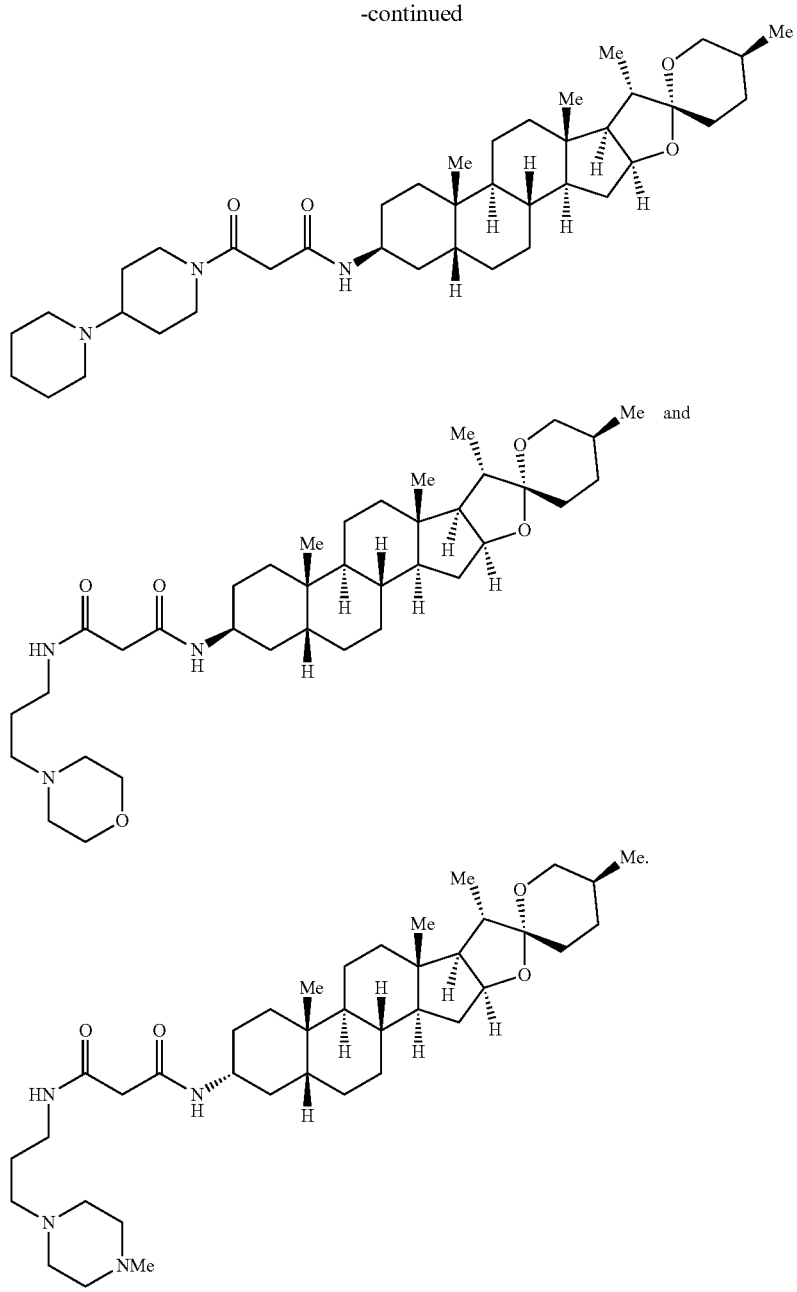

or a pharmaceutically acceptable salt thereof;
  wherein the pharmaceutically acceptable salt is selected from the group consisting of: hydrochloride, hydrobromide, sulfate, phosphate, mesylate, benzenesulfonate, p-toluenesulfonate, 1-naphthalene sulfonate, 2-naphthalene sulfonate, acetate, trifluoroacetate, malate, tartrate, citrate, lactate, oxalate, succinate, fumarate, maleate, benzoate, salicylate, phenylacetate and mandelate; and the anti-tumor agent is selected from the group consisting of: PD-1 antibody, CTLA-4 antibody, PD-L1 antibody and PD-L2 antibody.

* * * * *